United States Patent
Okamoto et al.

(10) Patent No.: US 6,471,073 B1
(45) Date of Patent: Oct. 29, 2002

(54) LIQUID EXTRACTING APPARATUS

(75) Inventors: Yoshihiro Okamoto; Eiji Ochi; Atsushi Tatani, all of Tokyo; Susumu Okino; Toru Takashina, both of Hiroshima, all of (JP)

(73) Assignee: Mitsubishi Heavy Industries, Ltd., Toyko (JP)

( * ) Notice: Subject to any disclaimer, the term of this patent is extended or adjusted under 35 U.S.C. 154(b) by 0 days.

(21) Appl. No.: 09/555,754

(22) PCT Filed: Sep. 24, 1999

(86) PCT No.: PCT/JP99/05222

§ 371 (c)(1),
(2), (4) Date: Jun. 2, 2000

(87) PCT Pub. No.: WO00/20089

PCT Pub. Date: Apr. 13, 2000

(30) Foreign Application Priority Data

Oct. 2, 1998 (JP) .............................. 10-281679

(51) Int. Cl.⁷ .................................................. B01D 21/24
(52) U.S. Cl. ..................... 210/521; 210/532.1; 210/540
(58) Field of Search ................................. 210/521, 522, 210/532.1, 540

(56) References Cited

U.S. PATENT DOCUMENTS

| | | | | |
|---|---|---|---|---|
| 3,482,694 A | * | 12/1969 | Rice et al. | 210/522 |
| 3,491,492 A | * | 1/1970 | McCann | 210/521 |
| 3,613,889 A | * | 10/1971 | Reed | 210/522 |
| 3,640,387 A | * | 2/1972 | Conley et al. | 210/521 |
| 4,305,819 A | * | 12/1981 | Kobozev et al. | 210/540 |
| 4,530,762 A | * | 7/1985 | Love | 210/521 |
| 4,783,255 A | * | 11/1988 | Bogusch | 210/522 |
| 4,793,926 A | * | 12/1988 | Vion | 210/521 |
| 4,929,349 A | * | 5/1990 | Beckman | 210/521 |

FOREIGN PATENT DOCUMENTS

| | | |
|---|---|---|
| DE | 110 612 A | 1/1975 |
| DE | 37 14092 C1 | 10/1988 |
| JP | 04215895 A | 8/1992 |
| JP | 05087799 A | 4/1993 |
| JP | 52-67873 | 10/1993 |
| JP | 53-22373 | 12/1993 |
| JP | 9-248403 | 9/1997 |
| KR | 98-2872 | 3/1998 |
| WO | WO 97/04874 | 2/1997 |

* cited by examiner

*Primary Examiner*—Christopher Upton
(74) *Attorney, Agent, or Firm*—Alston & Bird LLP

(57) ABSTRACT

A liquid extracting apparatus in accordance with the present invention is configured so that a connection pipe 22a (suction-side pipe) of a pump 22 for extracting slurry liquid content is connected to the upper end side of a liquid content introduction path to which slurry in a tank 8 can be introduced to attain the precipitation and separation of solid content, and a number of tubes 26 are packed at the lower end portion of the liquid content introduction path 21. The present invention can provide a simple liquid extracting apparatus that can effectively extract only liquid content in the slurry (suspension) moving in the tank.

20 Claims, 12 Drawing Sheets

F I G. 9(a)
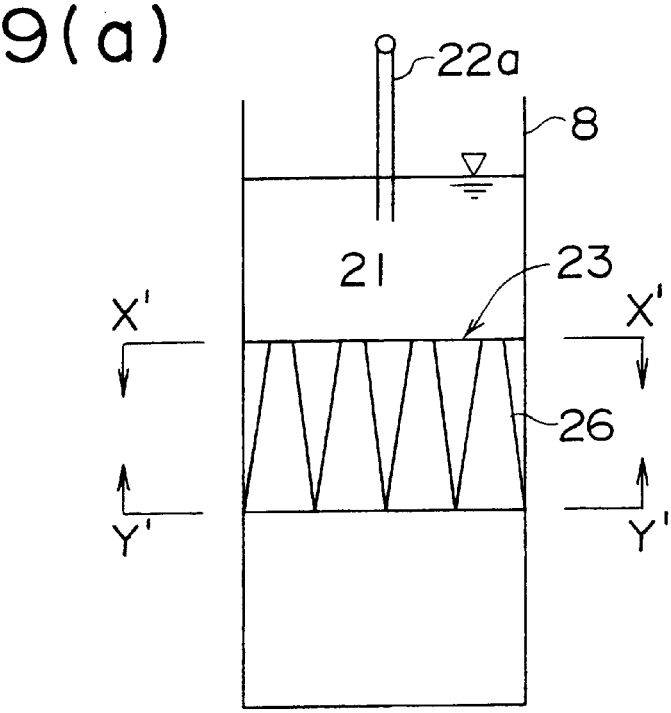
F I G. 9(b)
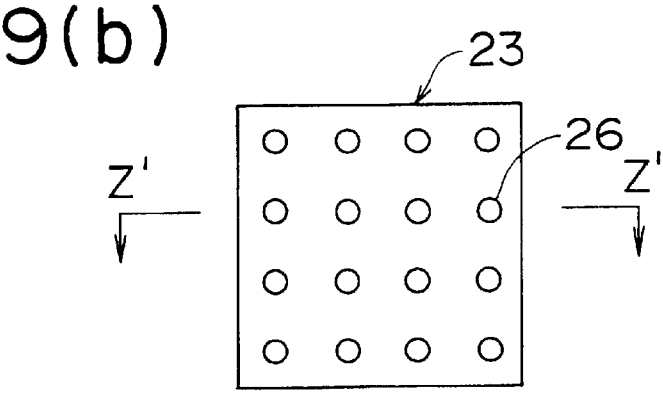
F I G. 9(c)
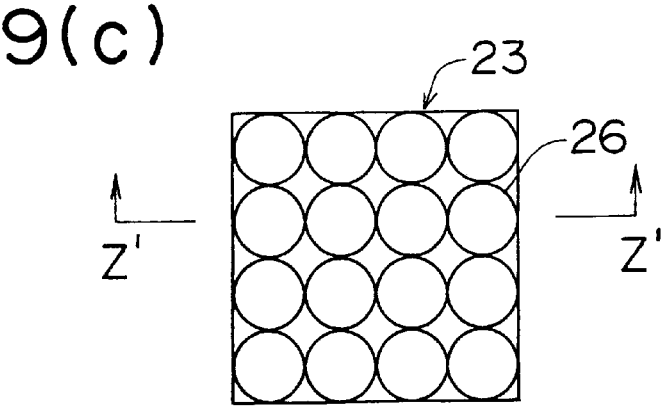

LIQUID EXTRACTING APPARATUS

TECHNICAL FIELD

The present invention relates to a liquid extracting apparatus suitable for an application to a filtrate tank and an absorber tank of a wet type flue gas desulfurization system, for example.

BACKGROUND ART

In recent years, as a flue gas desulfurization technique for mainly removing sulfur oxides such as sulfur dioxide from the flue gas produced in a thermal power plant etc., a wet type limestone-gypsum process of tank oxidation system has been used widely in which absorbent slurry in which calcium compounds such as limestone is suspended is sent from an absorber tank at the bottom of an absorber to a gas-liquid contact section at the upper part of the absorber to be brought into air-liquid contact with flue gas while being circulated, and oxidizing air is blown compulsorily into the absorber tank to oxidize the slurry having been brought into air-liquid contact in the absorber tank, by which gypsum is produced as a by-product.

In this flue gas desulfurization system, some of the slurry in the absorber tank is extracted to effect solid-liquid separation in order to recover gypsum. A filtrate produced by this solid-liquid separation is generally sent once to a filtrate tank, and thereafter some is returned to the absorber tank, and the remaining is treated as desulfurized waste water. This waste water treatment is performed to prevent harmful impurities such as chlorine in the flue gas from accumulating while being dissolved in the liquid content circulating in the flue gas desulfurization system. Depending on the capacity etc. of a waste water treatment system, a certain limitation is sometimes imposed on the suspended solid concentration (so-called SS concentration) of the waste water.

According to the performance of the solid-liquid separator for effecting the solid-liquid separation, the suspended solid concentration of the filtrate sometimes exceeds this limit. In this case, it is necessary to extract a liquid content with a relatively low suspended solid concentration from the filtrate in the filtrate tank and to send the same to a waste water treatment system as the desulfurized waste water.

Also, in the above-described flue gas desulfurization system, in order to achieve stable operation, it is necessary to regulate the slurry extraction amount etc. for recovering gypsum to keep the amount of slurry (liquid level) in the absorber tank in a certain range, and on the other hand it is also necessary to keep the slurry concentration (suspended solid concentration mainly consisting of gypsum) in the absorber tank in a certain range (normally, 20 to 30%).

The reason for this is as follows: If the slurry concentration is too high, a trouble such as clogging of a pipe or a pump in a circulation system for sending slurry to the upper part of the absorber and in a line for extracting slurry from the absorber tank is liable to occur, leading to difficulty in operation. If the slurry concentration is too low, so-called gypsum seed crystal in the slurry decreases, and most of the gypsum yielded successively by a reaction in the absorber tank caused by the absorption of sulfur dioxide deposits in a state such as to adhere to the surface of the equipment component, for example, to the inside wall surface of the absorber tank, which gypsum turns to scale to cause a trouble such as clogging of a pipe. Also, if the slurry concentration is low, a load for the treatment in which the extracted slurry is separated into solid and liquid to recover gypsum increases, which is disadvantageous in terms of operation cost.

The amount of sulfur dioxide in the flue gas always varies depending on the power generation load, etc. Therefore, the supply amount of absorbent (limestone, etc.) charged into the absorber tank must always be regulated to the necessary minimum amount according to the inlet sulfur dioxide amount thus varying. Also, a fixed amount of cleaning water for an air sparger or the like for blowing oxidizing air always flows into the absorber tank.

Therefore, for example, in a state in which the amount of sulfur dioxide in the flue gas is small (low-load state), the amount of solid content charged into the tank or produced in the tank is small. On the other hand, since a fixed amount of the aforementioned cleaning water always flows in, the concentration of slurry in the tank tends to decrease. In particular, when a wet cooling type dust removing section is provided on the upstream side of the absorber (in the case of soot separation system), the flue gas flowing into the absorber has almost been saturated by water vapor, so that the amount of water which evaporates in the absorber and is brought away by the flue gas is very small, and therefore, there is a high possibility of the concentration of slurry in the tank decreasing beyond the aforementioned certain range during the operation.

Even when the system is stopped (desulfurization is stopped), the cleaning water is usually caused to flow continuously. In this case, therefore, even if the soot separation system is not used, the concentration of slurry in the tank decreases beyond the aforementioned certain range.

Thereupon, in such a case, it is necessary to positively extract only the liquid content with a low suspended solid concentration from the absorber tank.

Conventionally, however, there is no simple and effective means for extracting the liquid content with a low suspended solid concentration from the filtrate tank or the absorber tank.

As a conventionally known apparatus of this type, a liquid extracting apparatus (an extractor for extracting clean liquid from suspension) has been disclosed in Japanese Utility Model Provisional Publication No. 60-159350 (No. 159350/1985). This apparatus is configured so that a cylinder whose lower end only is open and which is provided with a grating in the lower end opening is arranged so as to be submerged in suspension (slurry), and a suction pipe for a pump is connected to the closed upper end of the cylinder. The pump is operated to extract the liquid at a slow speed (for example, 1 m/h to 10 m/h) not higher than a predetermined flow velocity via the cylinder, by which the precipitation and separation of solid content in the cylinder are caused, thereby removing the liquid content with a low suspended solid concentration.

However, the liquid extracting apparatus disclosed in the above-described Publication has the following problems to be solved.

When the flow rate of the liquid content to be extracted is high or when the target suspended solid concentration in the liquid content to be extracted is low, in order to satisfy the condition at which the extraction speed is not higher than the predetermined flow velocity, the inside diameter of the cylinder must be increased, or a large number of cylinders must be provided. In this case, it is difficult to effectively extract only the liquid content with a low suspended solid concentration, or the construction of apparatus is complicated and expensive.

Specifically, if the inside diameter of the cylinder is merely increased, the aspect ratio (the ratio of inside diameter to length) of the cylinder increases inevitably, so that the influence of movement of the liquid in the tank (outside the cylinder) is liable to spread to the inner part of the cylinder. Therefore, the turbulence of flow of the liquid occurs excessively in the cylinder, so that even if the aforementioned condition is satisfied in terms of the average flow velocity, a portion where the upward flow is fast is produced partially, whereby the precipitation and separation are not attained effectively. As a result, the liquid content with a sufficiently low suspended solid concentration cannot be extracted.

Also, if an attempt is made to accommodate a high flow rate by merely providing a large number of cylinders, an increase in cost for installing a number of cylinders poses a problem. In particular, since the upper end of cylinder is closed, the manufacturing cost of the cylinder itself is high, so that if a number of cylinders are disposed in a state so as to be submerged in the slurry, a significant increase in cost occurs including the cost for installing members for supporting the cylinders.

The above-described Publication has disclosed a technique in which a grating is provided in the lower end opening of the cylinder to lessen the influence of liquid movement.

However, the rough grating with a high aspect ratio (the ratio of width to length) of each section as shown in FIG. 2 of the above-described Publication provides insufficient performance to lessen the influence of liquid movement. In particular, in the case where the inside diameter of cylinder must be increased as described above because of a high flow rate of liquid content to be extracted or in the case of a tank in which an agitator is provided to cause the slurry in the tank to move heavily, such as the aforementioned absorber tank and filtrate tank of flue gas desulfurization system, the flow of liquid in the cylinder is liable to be made turbulent by the influence of liquid movement outside the cylinder.

If an attempt is made to merely decrease the width of each section of the grating in order to enhance the performance of the grating, the manufacturing cost of cylinder further increases, which likewise suffers a disadvantage in terms of cost. The reason for this is as follows: As shown in FIG. 2 of the above-described Publication, the structure of the grating is thought to be such that, for example, the side edges of a plurality of partition plates are fixed to the inner peripheral surface on the lower end side of the cylinder, so that the manufacture of cylinder is originally troublesome. If an attempt is made to form this structure in large numbers with a fine mesh provided in a large cylinder, a considerable increase in cost occurs. Although the specific construction in which the grating is formed and assembled to the cylinder has not been described at all in the above-described Publication, it is apparent that when, for example, an attempt is made to accommodate a high flow rate, a significant increase in cost occurs depending on the mode, inferring from the structure shown in FIG. 2 of the above-described Publication.

DISCLOSURE OF THE INVENTION

Accordingly, an object of the present invention is to provide a simple and less-costly liquid extracting apparatus that can effectively extract only liquid content in slurry in a tank even if the slurry in the tank moves.

To achieve the above object, the liquid extracting apparatus of a first embodiment of the present invention is a liquid extracting apparatus for discharging slurry liquid content with a lower suspended solid concentration than that of slurry in which solid content is suspended in liquid from a tank in which the slurry is stored, comprising:

a liquid content introduction path configured so that the lower end thereof is open toward the bottom surface of the tank so that the slurry can be introduced from the lower end side to achieve the precipitation and separation of solid content; liquid extracting means connected to the upper end side of the liquid content introduction path to extract slurry liquid content from the tank via the liquid content introduction path; and flow straightening means provided at the lower end portion of the liquid content introduction path. The flow straightening means is preferably configured so that the lower end portion of the liquid content introduction path is divided into a number of long flow paths along the flow direction.

Also, the liquid extracting apparatus of a second embodiment is characterized in that the flow straightening means is configured so that a number of tubes are provided at the lower end portion of the liquid content introduction path in a packed state.

Also, the liquid extracting apparatus of a third embodiment is characterized in that the flow straightening means is configured so that a number of tubes are placed closely on a net-shaped member installed so as to cover the lower end opening of the liquid content introduction path.

Also, the liquid extracting apparatus of a fourth embodiment is characterized in that the flow straightening means is configured so that a plurality of plate-shaped members in which a number of chambers or holes that are open on the upper and lower face sides are formed over the whole face thereof are stacked as necessary, and are disposed so as to occupy the whole of lower end portion of the liquid content introduction path; and a number of long flow paths are formed along the flow direction by the chambers or holes.

Also, the liquid extracting apparatus of a fifth embodiment is characterized in that the liquid content introduction path is formed by partitioning a part of the tank by a partition wall whose upper edge projects above the liquid level in the tank and whose lower edge extends below the liquid level in the tank, and the upper end side of the liquid content introduction path is also open.

Also, the liquid extracting apparatus of a sixth embodiment is characterized in that the liquid extracting means is formed by an outflow port of slurry formed at a position lower than the slurry liquid level on the side wall of the tank, so that slurry in the tank is caused to flow out by a head difference.

Also, the liquid extracting apparatus of a seventh embodiment is characterized in that the liquid extracting means is connected to a plurality of locations in the radial direction of the liquid content introduction path.

Also, the liquid extracting apparatus of an eighth embodiment is characterized in that the interior of the liquid content introduction path is divided by walls for each location to which the liquid extracting means is connected.

According to the above-described liquid extracting apparatus in accordance with the present invention, only the liquid content can be extracted effectively from the tank in a manner described below by using a simple and less-costly construction in which the liquid extracting means is connected to the liquid content introduction path provided with flow straightening means.

Since the flow straightening means has a construction such that the lower end portion of the liquid content introduction path is divided into a number of long flow paths along, the flow direction, the influence of slurry movement in the tank is lessened sufficiently and does not reach the interior of the liquid content introduction path, regardless of the inside dimensions of the whole of the liquid content introduction path. Therefore, if the inside dimensions of the liquid content introduction path (cross-sectional area of flow path) are set so that the average flow velocity in the liquid content introduction path is lower than the precipitation speed of solid content, the precipitation and separation of solid content in the liquid content introduction path are attained effectively. As a result, even when a high flow rate is extracted, or when a liquid content with a lower suspended solid concentration is extracted (that is, when the inside dimensions of the liquid content introduction path cannot be set large), a predetermined amount of only the liquid content with a concentration not higher than the predetermined value can be extracted with high reliability.

As in the case of the above-described second embodiment, when the flow straightening means is configured by providing a number of tubes at the lower end portion of the liquid content introduction path in a packed state, the manufacturing cost and assembling cost of the flow straightening means are reduced, which is particularly advantageous when a liquid content introduction path with large inside dimensions is used.

In particular, as in the case of the above-described third embodiment, when the flow straightening means is configured by placing a number of tubes closely on the net-shaped member installed so as to cover the lower end opening of the liquid content introduction path, the assembling of the flow straightening means is completed by a very simple operation such that, for example, a number of tubes are dropped onto the net-shaped member after the net-shaped member is installed.

Also, as in the case of the above-described fourth embodiment, even when the flow straightening means is configured by stacking, as necessary, the plurality of plate-shaped members in which a number of chambers or holes that are open on the upper and lower face sides are formed over the whole face thereof and by disposing the plate-shaped members so as to occupy the whole of lower end portion of the liquid content introduction path, the liquid content can be extracted effectively at a low cost.

In this case as well, since the chambers or holes are stacked as necessary and communicate with each other, whereby a number of long flow paths are formed along the flow direction, the influence of slurry movement in the tank can be lessened sufficiently. Also, since a structure such as the plate-shaped member described above can be manufactured easily, for example, by integral molding of a synthetic resin, the installation cost is relatively low even when the apparatus is large in size.

Also, as in the case of the above-described fifth embodiment, when the liquid content introduction path is formed by partitioning a part of the tank by a partition wall whose upper edge projects above the liquid level in the tank and whose lower edge extends below the liquid level in the tank, and the upper end side of the liquid content introduction path is also open, even if air bubbles flow into the liquid content introduction path, most of the air bubbles escape from the upper end opening of the liquid content introduction path and is not mixed in the extracted liquid. Therefore, a trouble is avoided such that smooth extraction of liquid content is hindered by the air bubbles or a pump constituting the liquid extracting means is damaged.

Further, in this case, the cost for installing the liquid content introduction path can be reduced as compared with the case where the upper end of the liquid content introduction path is closed.

Also, as in the case of the above-described sixth embodiment, when the liquid extracting means is formed by an outflow port of slurry formed at a position lower than the slurry liquid level on the side wall of the tank, and therefore slurry in the tank is caused to flow out by a head difference, the liquid content can be extracted without the use of a pump, so that the pump installation cost and the pump power can be saved.

Also, as in the case of the above-described seventh embodiment, when the liquid extracting means is connected to a plurality of locations in the radial direction of the liquid content introduction path, the inflow of liquid into the liquid extracting means is effected at the plurality of locations in the radial direction of the liquid content introduction path. Therefore, for example, when a large amount of liquid content is to be extracted by increasing the inside dimensions of the liquid content introduction path, the deflection of flow velocity caused by the inflow of liquid from the liquid content introduction path to the liquid extracting means effected concentrically at a part in the radial direction of the liquid content introduction path can be reduced.

Also, as in the case of the above-described eighth embodiment, when the interior of the liquid content introduction path is divided by walls for each location to which the liquid extracting means is connected,. convection caused by temperature difference etc. in the liquid content introduction path is restrained, so that the liquid content of a high flow rate can be extracted reliably as a whole. Specifically, for example, when a large amount of liquid content is to be extracted by merely increasing the inside dimensions of the liquid content introduction path, even if the influence of slurry movement outside the liquid content introduction path can be lessened by the flow straightening means, there is a fear of convection caused by temperature difference etc. in the interior of the liquid content introduction path. In the case of the present invention, however, the liquid content introduction path is divided into narrow introduction paths, and the liquid extracting means (for example, a pump) is connected for each of the sections, so that such convection is less liable to occur. Therefore, the reliability is further enhanced when the liquid content of a high flow rate is to be extracted, or when the liquid content with a lower suspended solid concentration is to be extracted.

BRIEF DESCRIPTION OF THE DRAWINGS

FIGS. 9($a$), 9($b$) and 9($c$) are a sectional view taken along the line Z'—Z' ($a$), a view taken in the direction of the arrows along the line X'—X' ($b$), and a view taken in the direction of the arrows along the line Y'—Y' ($c$), respectively, showing flow straightening means in which tapered tubes are used in place of cylindrical tubes 26 shown in FIG. 2;

Figure 1:
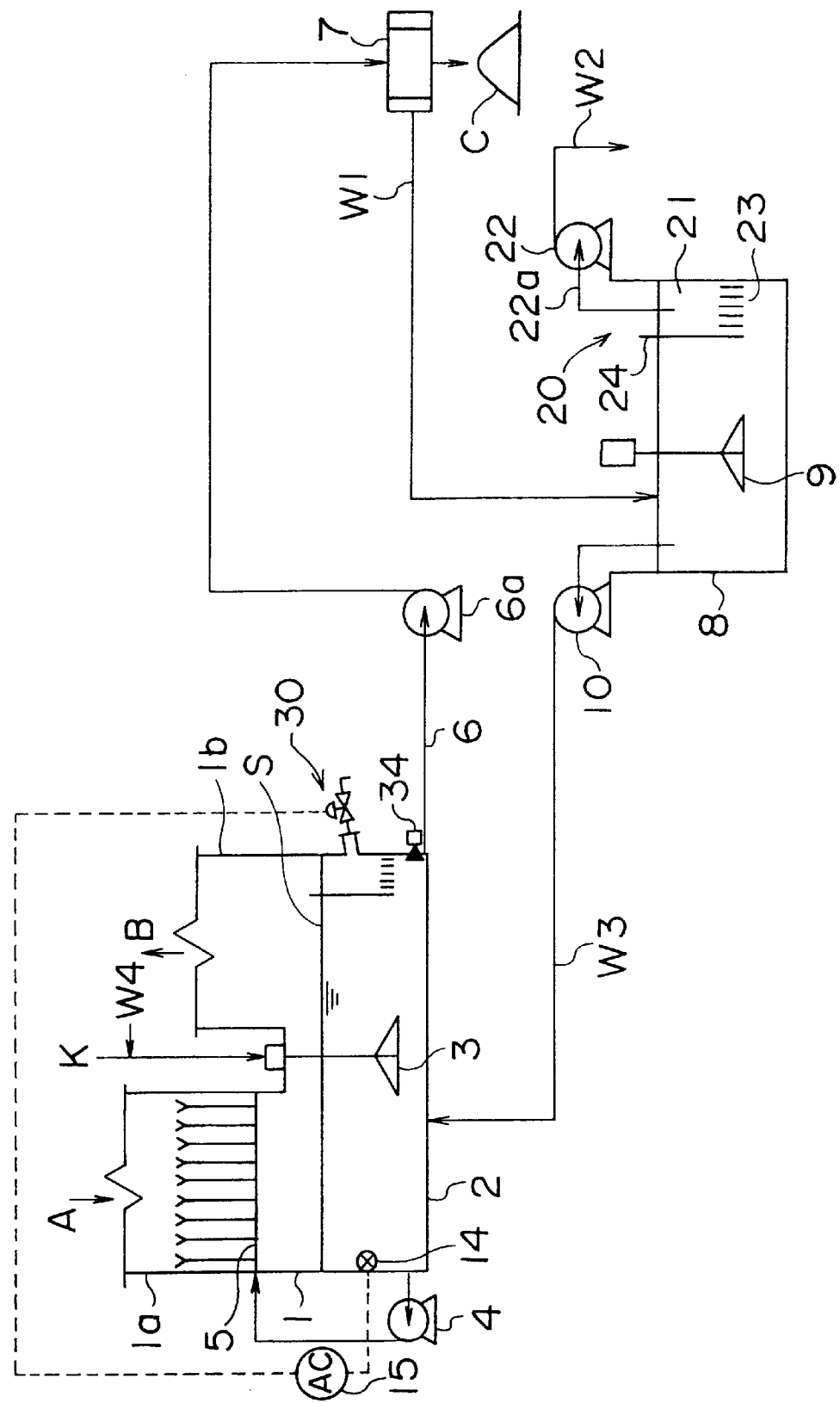
FIG. 1 is a schematic view showing an example of a wet type flue gas desulfurization system to which the present invention is applied.

In the above figures, reference numeral 1 denotes an absorber, 2 denotes a tank (absorber tank), 3 denotes an arm rotating type air sparger (agitator), 8 denotes a filtrate tank, 9 denotes an agitator, 20 denotes an air extracting apparatus (for filtrate tank), 21 denotes a liquid content introduction path, 22 denotes a pump (liquid extracting means), 22*a* denotes a connection pipe, 23 denotes flow straightening means, 24 denotes a partition wall, 25*a* and 25*b* denote walls, 26 denotes a tube, 27 denote a net-shaped member, 30 denotes a liquid extracting apparatus (for absorber tank), 31 denotes liquid extracting means, 32 denotes a liquid content introduction path, 33 denotes flow straightening means, 34 denotes an agitator, 35 denotes a conduit (outflow port), 36 denotes a valve, 37 denotes a partition wall, 38 denotes a net-shaped member, 39 denotes a tube, 51 denotes a plate-shaped member, S denotes slurry, W1 denotes filtrate (slurry), and W2 denotes waste water (liquid content).

PREFERRED EMBODIMENTS FOR CARRYING OUT THE INVENTION

An embodiment of the present invention will now be described with reference to the accompanying drawings.

FIG. 1 is a schematic view showing an example of a wet type flue gas desulfurization system of tank oxidation system to which the present invention is applied.

The system shown in FIG. 1 is provided with a so-called arm rotating type air sparger 3, which blows oxidizing air K in slurry S as fine bubbles while agitating the slurry S in a tank 2 (hereinafter referred to as an absorber tank 2 in some cases), in the tank 2 provided at the bottom of an absorber 1 to oxidize all amounts of the slurry S by efficiently bringing the slurry S having absorbed sulfur dioxide in the tank 2 into contact with the air, thereby obtaining gypsum.

Specifically, in this system, untreated flue gas A is introduced into a flue gas inlet section 1*a* of the absorber 1, and is brought into contact with the slurry S sprayed from spray pipes 5 by means of a circulation pump 4, by which at least sulfur dioxide in the untreated flue gas A is absorbed and removed. Thereafter, the flue gas is discharged through a flue gas outlet section 1*b* as treated flue gas B. The slurry S that is sprayed from the spray pipes 5 and flows down while absorbing sulfur dioxide comes into contact with a large number of air bubbles blown while being agitated by the sparger 3 in the tank 2 and is oxidized, and further undergoes neutralization reaction, turning to a slurry containing gypsum of a high concentration.

The principal reactions taking place in the above processing are as shown by reaction formulae (1) to (3). Needless to say, as the air sparger 3, a so-called fixed type air sparger, in which a number of fixed air distribution pipes are arranged, can be used instead of the so-called arm rotating type air sparger.

(absorber flue gas introduction section)

$$SO_2+H_2O \rightarrow H^++HSO_3^- \tag{1}$$

(tank)

$$H^++HSO_3^-+1/2O_2 \rightarrow 2H^++SO_4^{2-} \tag{2}$$

$$2H^++SO_4^{2-}+CaCO_3+H_2O \rightarrow CaSO_4 \cdot 2H_2O+CO_2 \tag{3}$$

Thus, in the tank 2, the slurry S in which gypsum and small amounts of limestone, an absorbent, are mainly suspended is stored steadily. In this case, the slurry S is supplied to a solid-liquid separator 7 through a pipeline 6 extending from a side wall of the tank 2 and a pump 6*a*, and is extracted as gypsum C with less water (usually, water content of about 10%) after being filtered.

On the other hand, filtrate W1 from the solid-liquid separator 7 is sent to a filtrate tank 8. The filtrate tank 8, which is a tank provided as an underground pit in this case, is provided with an agitator 9. Some of the liquid in this filtrate tank 8 is extracted by a liquid extracting apparatus 20, described later, and is sent to a waste water treatment equipment etc., not shown, for being treated as waste water W2 with a low suspended solid concentration (desulfurized waste water). Also in this case, the remaining of the liquid in the filtrate tank 8 is returned to, for example, the absorber tank 2 as returned liquid W3 by means of a pump 10 as it is.

The flow rate Q2 of the waste water W2 is set appropriately depending on the scale of the flue gas desulfurization system and the properties of the flue gas, and is changed appropriately as necessary even during the operation (or may continuously be controlled variably). For example, for the flue gas desulfurization system (flue gas treatment amount; 3 million m³N/h) provided in a thermal power plant with an output of 1 million Kw, the flow rate Q2 is generally about 20 m³/h at the maximum. Also, the flow rate of the returned liquid W3 can be controlled by a flow rate control valve etc., not shown, so that the liquid level in the filtrate tank 8 is kept in a certain range. Although the returned liquid W3 may be returned directly to the absorber tank 2, it may be supplied to a slurry preparation tank, described later, and may be returned to the tank 2 as a liquid content constituting absorbent slurry.

As a calcium compound (limestone in this case), which is an absorbent, for example, a substance prepared into a slurry form in the slurry preparation tank, not shown, (that is, absorbent slurry) is used. Specifically, in the slurry preparation tank, pulverized limestone charged from a limestone silo (not shown) and a liquid content such as industrial water supplied separately are agitated and mixed into absorbent slurry. This absorbent slurry is supplied appropriately to the tank 2 of the absorber 1 via a slurry pump (not shown).

During the operation, in the slurry preparation tank, the amount of charged water is regulated by, for example, a controller and a flow rate control valve, not shown. Also, by controlling the operation of a rotary valve (not shown) of the limestone silo, limestone is supplied appropriately according to the amount of charged water. Thereupon, a state in which absorbent slurry with a predetermined concentration (for example, about 20 to 30%) is always stored in a level of a certain range is maintained.

Also, during the operation, in order to increase the desulfurization percentage and the gypsum purity, the concentration of sulfur dioxide in the untreated flue gas A, the pH value in the tank, the concentration of limestone, or like is detected by using a sensor (not shown), by which the supply amount etc. of limestone (absorbent slurry) are regulated appropriately by means of a controller, not shown.

Also, the amount of slurry extracted from the pipeline 6 is regulated by a flow rate control valve or the like (not shown) so that the amount of slurry (liquid level) in the tank 2 is controlled so as to be constant.

Also, for example, to the tank 2, make-up water (industrial water, etc.) is supplied as necessary to supplement water decreased gradually by evaporation etc. in the absorber Further, clean water W4, together with the air K, is fed to the air sparger 3 to prevent solid contents from adhering to the inside of nozzle for blowing air. This cleaning water W4 flows out into the slurry together with the air K.

The flow rate of the cleaning water W4 is normally set at about 4 m$^3$/h in the case of a desulfurization system of a scale such as to treat flue gas of about 1 million m$^3$N/h, for example.

The liquid content of the slurry S in the tank 2 of the absorber 1 can be extracted by a liquid extracting apparatus 30, described later, as necessary so that the suspended solid concentration of the slurry S in the tank 2 can easily be kept not lower than a predetermined value even at the time of low load etc.

Next, the liquid extracting apparatus 20 provided in the filtrate tank 8 will be described with reference to FIGS. 1 to 4.

The liquid extracting apparatus 20 is an apparatus for discharging a liquid content with a lower suspended solid configuration than that of the filtrate W1 from the filtrate tank 8 as the waste water W2. In this case, the liquid extracting apparatus 20 is provided when the suspended solid concentration of the filtrate WI is outside the range allowable as waste water (for example, 500 mg/l or lower) (that is, when the filtrate W1 cannot be handled as waste water as it is). As shown in FIG. 1, the liquid extracting apparatus 20 comprises a liquid content introduction path 21 the lower end side of which is open toward the bottom surface of the filtrate tank 8 so that the filtrate in the filtrate tank 8 can be introduced from the lower end side to achieve the precipitation and separation of suspended solids, a pump 22 (liquid extracting means) which is connected to the upper end side of the liquid content introduction path 21 to extract the liquid content from the filtrate tank 8 via the liquid content introduction path 21, and flow straightening means 23 which is provided at the lower end portion of the liquid content introduction path 21 to divide the lower end portion of the liquid content introduction path 21 into a number of long flow paths along the flow direction.

Figure 2:
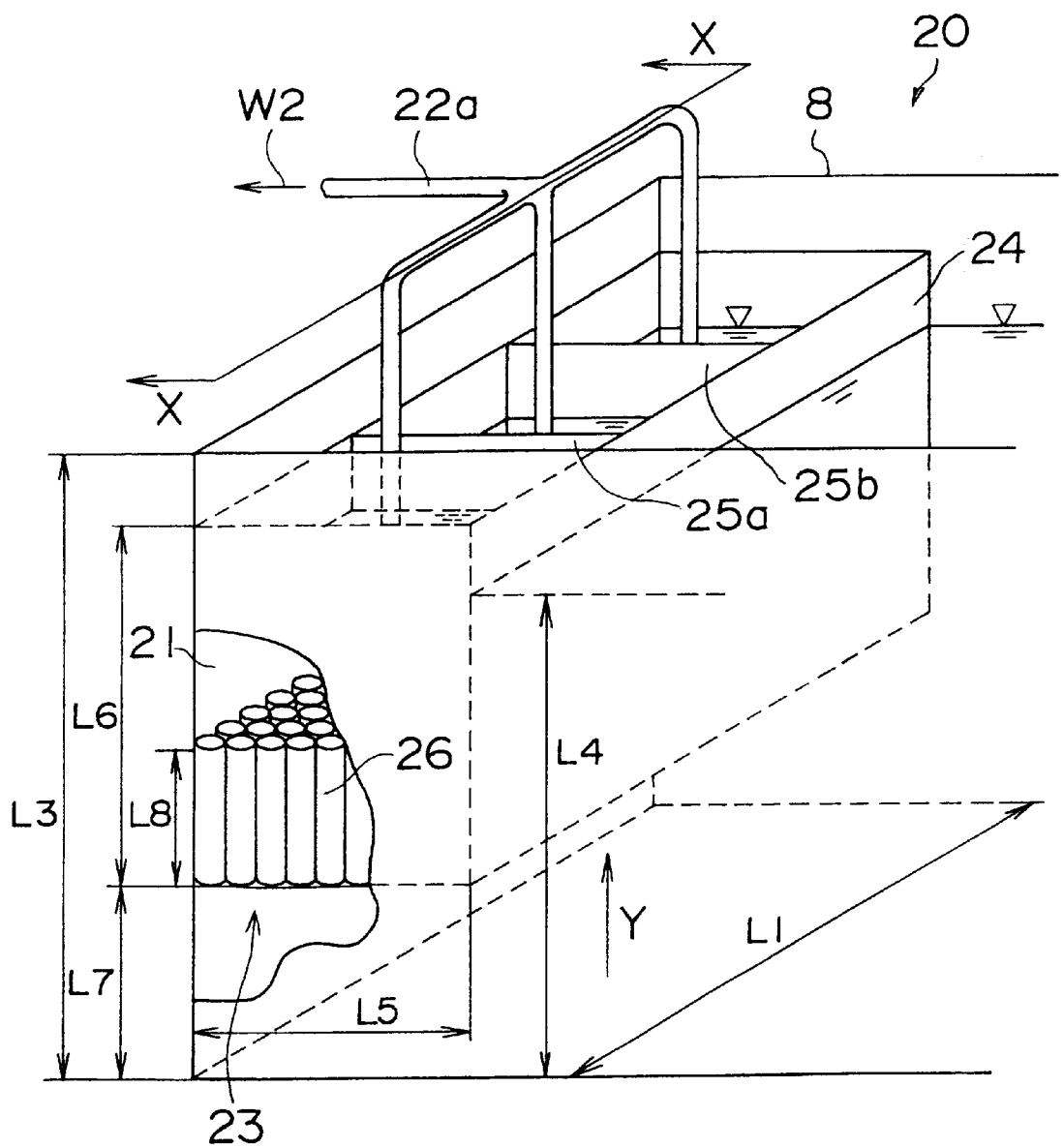
FIG. 2 is a perspective view of a liquid extracting apparatus for a filtrate tank of the system.

As shown in FIG. 2, the liquid content introduction path 21 is formed by partitioning a part of the filtrate tank 8 by a partition wall 24 whose upper edge projects above the liquid level in the filtrate tank 8 and whose lower edge extends below the liquid level in the filtrate tank 8. The upper end side of the liquid content introduction path 21 is also open.

As shown in FIG. 3, the interior of the liquid content introduction path 21 in this case is divided into three introduction paths 21a, 21b and 21c by walls 25a and 25b.

The inside dimensions (width L5 and depth L1) are set so that when the slurry is discharged via the pump 22 through the liquid content introduction path 21, the flow velocity of liquid content in a region above the flow straightening means 23 in which there is no turbulence is lower than the precipitation speed of the suspended solids as a whole.

Specifically, since the particle size of the suspended solid in the slurry S is about 40$\mu$ on an average, if the average flow velocity V in the liquid content introduction path 21 is set so as to be not higher than 10 m/h, for example, the flow velocity becomes lower than the precipitation speed of suspended solid. Therefore, since the inside area of the liquid content introduction path 21 is Q2/V (Q2 is the maximum flow rate of the waste water W2), assuming that Q2 is set at the aforementioned 20 m$^3$/h, for example, the inside area is 20/10=2 m$^2$. In this case, therefore, the inside dimensions may, leaving a margin, be set so that the inside area is 3 m$^2$, for example.

Also, the length of the liquid content introduction path 21 should be set so that a distance L9 (shown in FIG. 3(a)) between the upper face of the flow straightening means 23 and the tip end opening of a connection pipe 22a, described later, is sufficiently secured to prevent the flow velocity in the flow straightening means 23 from being deflected by the influence of flow of the liquid into the connection pipe 22a.

For example, for the flue gas desulfurization system provided in a thermal power plant with an output of 1 million Kw, the inside dimensions (length L1 and width (not shown)) of the filtrate tank 8 are about 3.0 m each, the depth L3 of the filtrate tank 8 is about 3.5 m, and the height L4 of the liquid level is regulated so as to be in the range of, for example, 2.8 to 3.2 m. In this case, therefore, the width L5 of the liquid content introduction path 21 may be set at about 1.0 m, for example, the height L6 of the partition wall 24 may be set at about 2.2 m, for example, the distance L7 from the bottom surface of the filtrate tank 8 to the lower end of the liquid content introduction path 21 (partition wall 24) may be set at about 1.2 m, for example, and the length L8 of the flow straightening means 23 (the length of tube 26, described later) may be set at about 1.0 m, for example. Thereby, the inside area (cross-sectional area of flow path) of the liquid content introduction path 21 is made about 3 m$^2$ as a whole, and the aforementioned distance L9 of about 0.5 m can be secured.

If the inside area of the liquid content introduction path 21 is set larger, and the average flow velocity V of slurry rising in the liquid content introduction path 21 is set lower, the liquid content with a lower suspended solid concentration can be extracted. Therefore, the inside dimensions of the liquid content introduction path 21 may be set appropriately according to the required suspended solid concentration and flow rate of the liquid to be extracted.

However, when the inside dimensions are merely made larger, convection is produced by the deflected temperature distribution, etc., so that the flow velocity is liable to be deflected even if the straightening means 23 is present. Therefore, the number of sections into which the liquid content introduction path 21 is divided should preferably be increased with increasing inside dimensions. Also, the connecting locations of the connection pipe of the pump 22 should be provided in larger numbers in the radial direction (in this case, horizontal direction) according to the inside dimensions of the liquid content introduction path 21 to reduce the deflection of flow velocity caused by the concentration of inflow ports of the connection pipe.

In this case, the pump 22 is one pump provided on the ground, and a predetermined maximum amount of waste water can be discharged by the one pump. The suction opening of the pump 22 is connected to each of the upper end sides of the induction paths 21a, 21b and 21c via the connection pipe 22a. Specifically, the tip end side of the connection pipe 22a branches into three pipes in this case, and the tip end portion of each branch pipe extends from the central upper part of each introduction path to under the liquid level therein.

Needless to say, the height of each open tip end portion of the connection pipe 22a is always located under the liquid level regardless of the fluctuation in liquid level. Also, a plurality of pumps 22 may be provided for the filtrate tank 8. For example, the pumps may be provided for each of the introduction paths 21a, 21b and 21c so that the suction opening of each pump is connected to each of the introduction paths 21a, 21b and 21c via a separate pipe, by which the flow rate of the waste water W2 can be discharged by a total of three pumps.

Also, each of the three branch pipes of the connection pipe 22a may be provided with a shut-off valve as necessary so that the operation of any introduction path can be stopped.

The flow straightening means 23 divides the lower end portion of the liquid content introduction path 21 into a number of long flow paths along the flow direction. In this case, specifically, as shown in FIGS. 3(a) and 3(b), a number of tubes 26 are bundled and provided on the lower end side of the introduction paths 21a, 21b and 21c in a packed state. Thereupon, a number of long flow paths are formed along the flow direction by the internal spaces of the tubes 26 and spaces surrounded by the outer peripheries of the tubes 26.

Figure 3A:
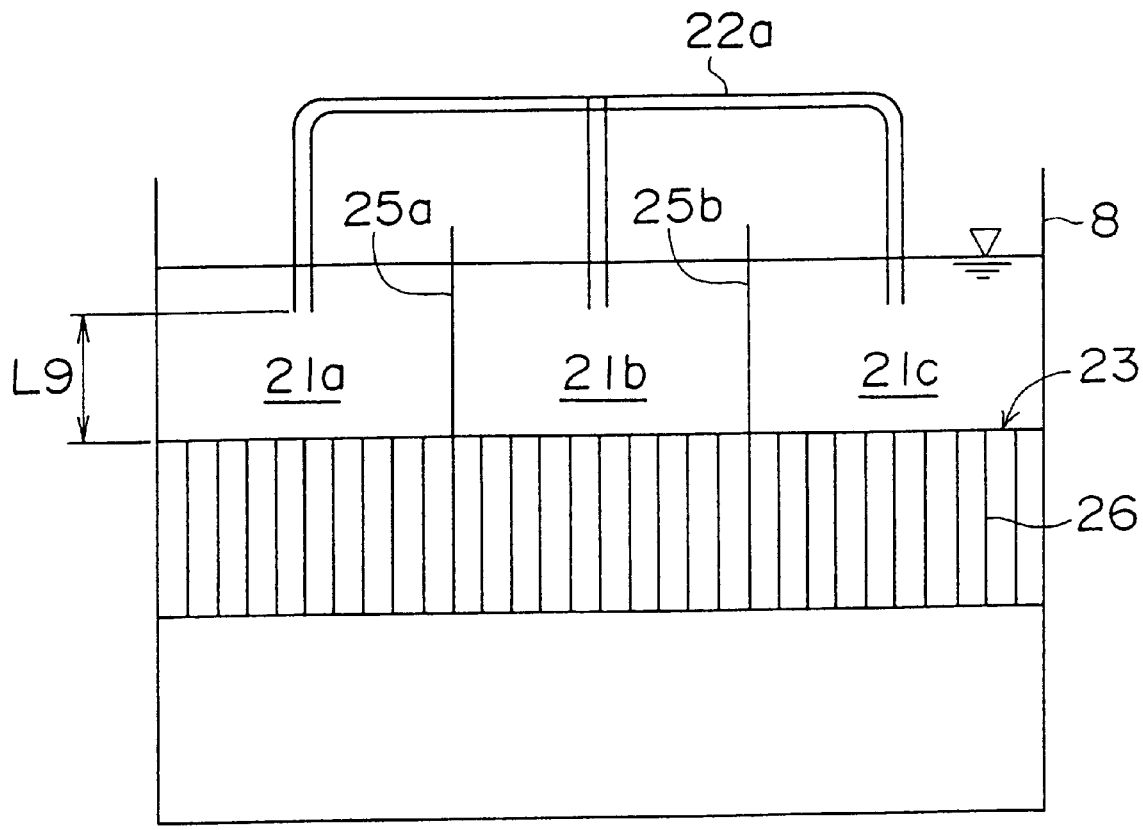
FIG. 3($a$) is a sectional view taken along the line X—X of FIG. 2, and FIG. 3($b$) is a view taken in the direction of the arrow Y.
Figure 3B:
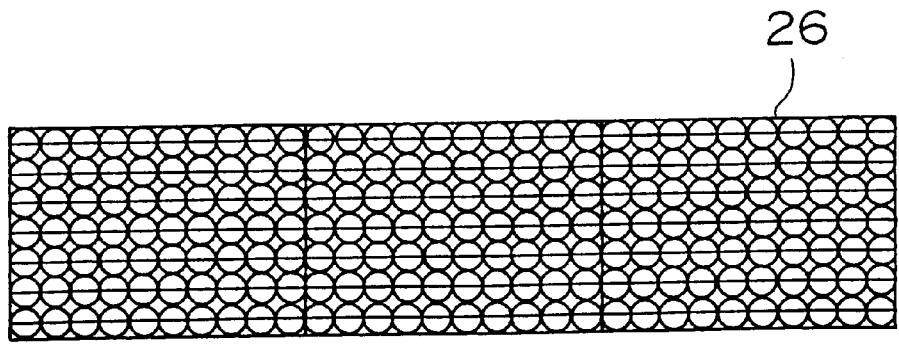
Figure 10A:
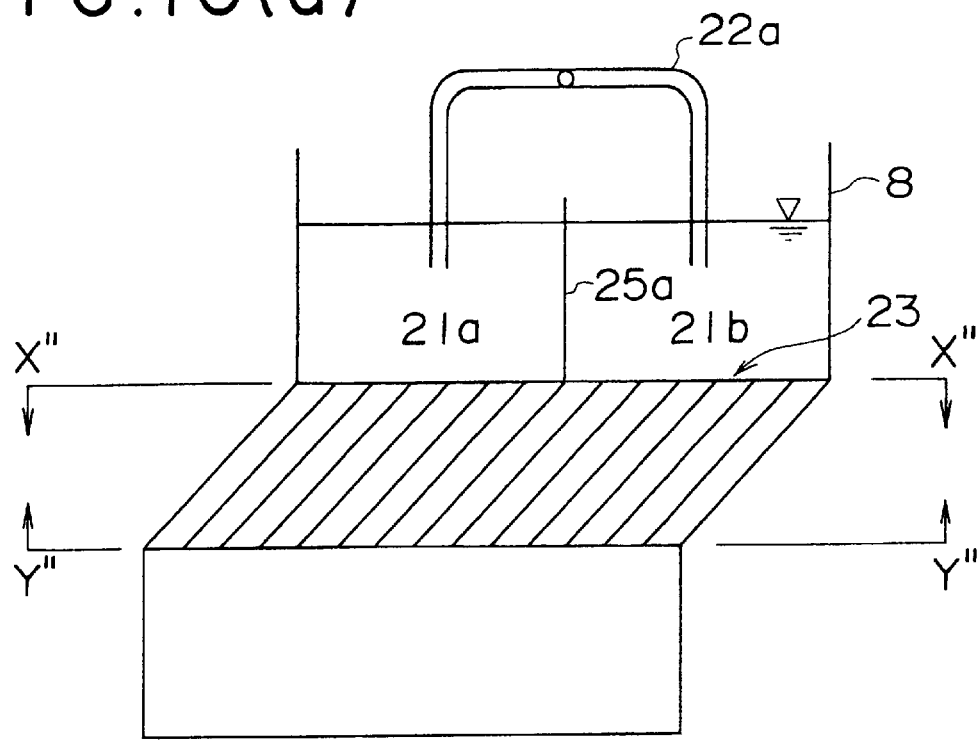
FIGS. 10(*a*), 10(*b*) and 10(*c*) are a sectional view taken along the line Z"—Z" (a), a view taken in the direction of the arrows along the line X"—X" (b), and a view taken in the direction of the arrows along the line Y"—Y" (c), respectively, showing flow straightening means 23 arranged slantwise as a whole in place of a tube packing arrangement shown in FIG. 2.
Figure 10B:
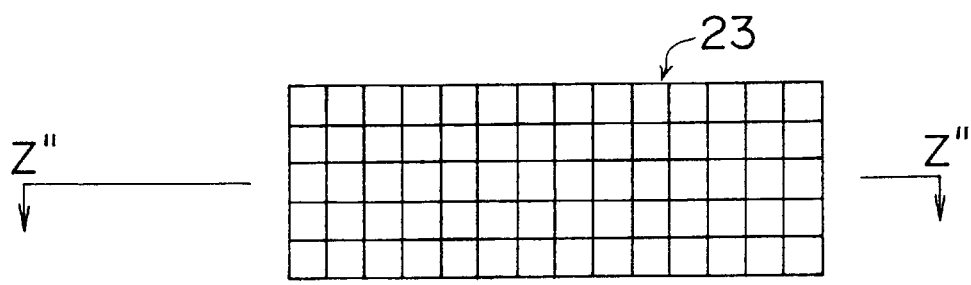
Figure 10C:
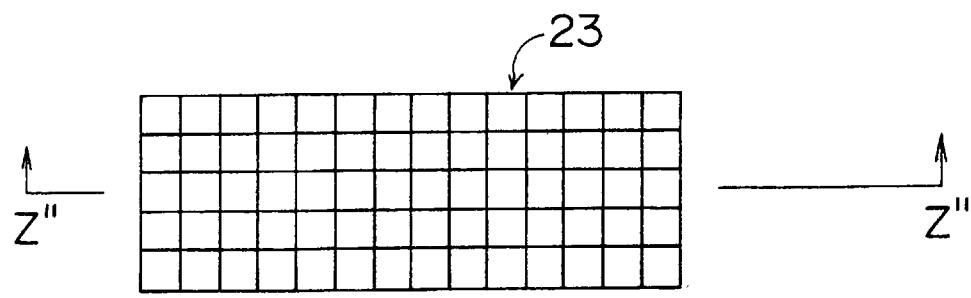
Figure 11A:
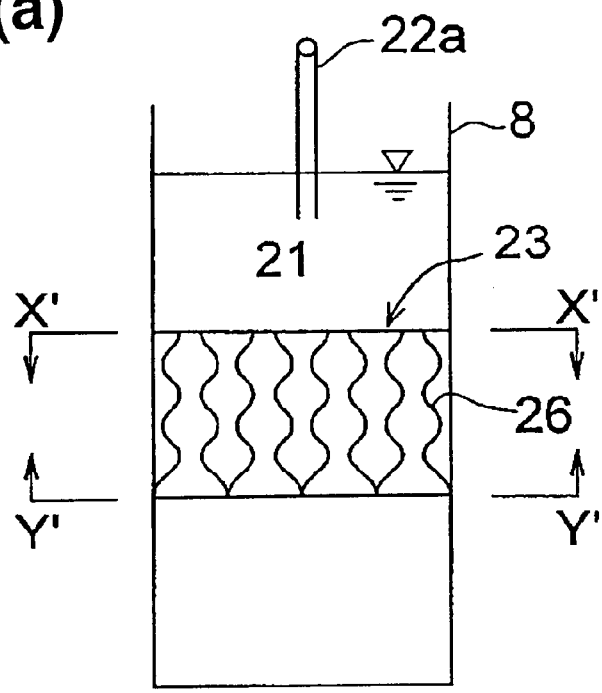
FIGS. 11(*a*), 11(*b*) and 11(*c*) are a sectional view taken along the line Z'—Z' (a), a view taken in the direction of the arrows along the line X'—X' (b), and a view taken in the direction of the arrows along the line Y'—Y' (c), respectively, showing flow straightening means in which bellows shaped tubes are used in place of cylindrical tubes 26 shown in FIG. 2.
Figure 11B:
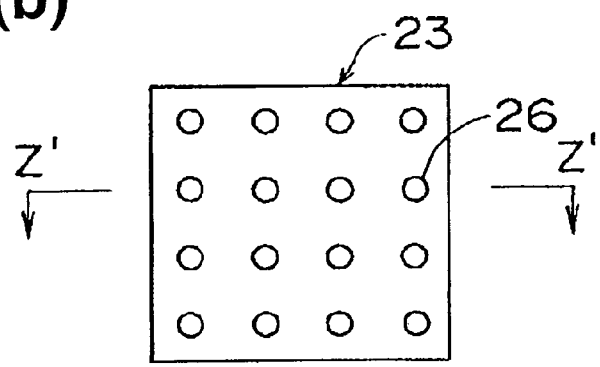
Figure 11C:
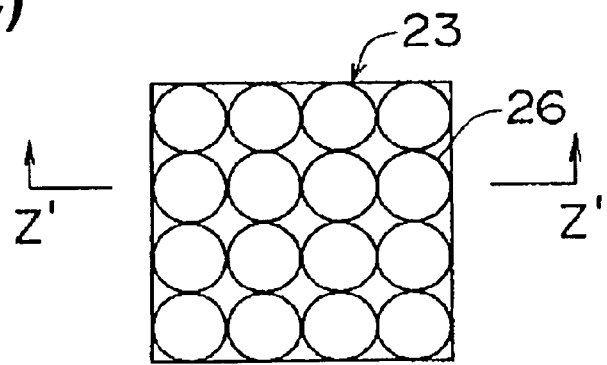
Figure 12A:
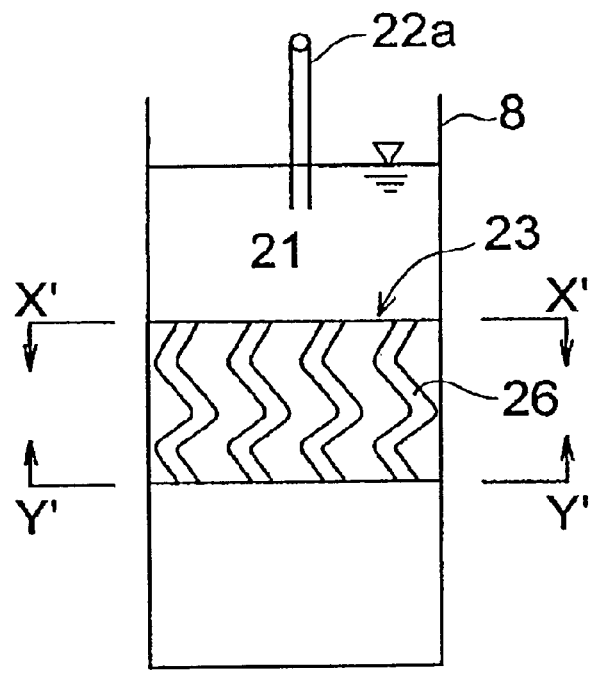
FIGS. 12(*a*), 12(*b*), 12(*c*), and 12(*d*) are a sectional view taken along the line Z'—Z' (a), a view taken in the direction of the arrows along the line X'—X' (*b*), a view taken in the direction of the arrows along the line Y'—Y' (c), and a perspective view, respectively, showing flow straightening means in which spirally bent tubes are used in place of cylindrical tubes 26 shown in FIG. 2.
Figure 12B:
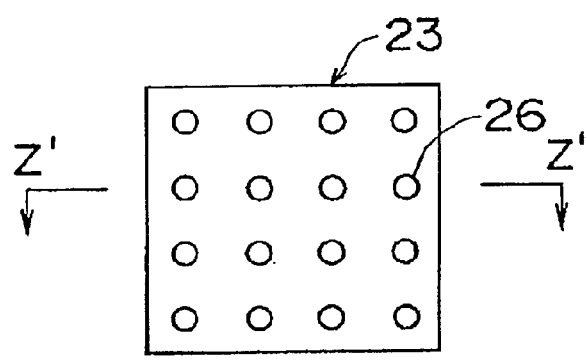
Figure 12C:
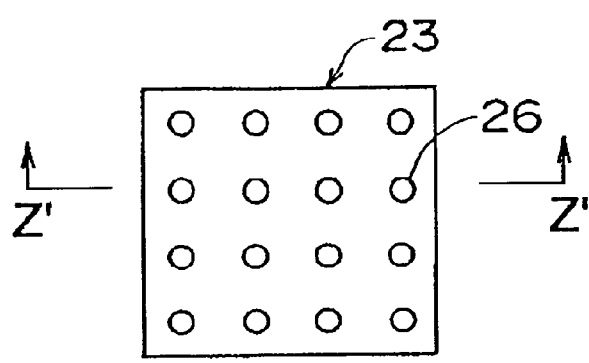
Figure 12D:
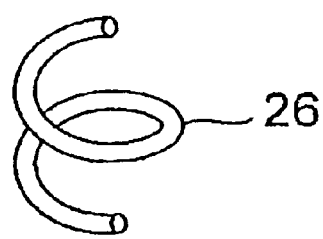

In FIGS. 3(a) and 3(b), the tube 26 has a simple cylindrical shape, and a plurality of tubes 26 are packed in a vertical state. However, the tubes 26 are not necessarily limited to the configuration shown in the figures, and can be modified variously. For example, the shape of the tube may be a tapered shape (see FIG. 9), a bellows shape (see FIG. 11), a "dango" shape, or a spirally bent shape (see FIG. 12). On. the other hand, the packed arrangement of tubes may be a wholly slantwise arrangement (see FIG. 10), a slantwise crossing arrangement, or a wholly torsional arrangement according to the restriction of installation location.

As the assembling construction of the tubes 26, a number of tubes are bundled into a shape of the inside of each induction path and are fixed to each other by welding, bonding, caulking, etc. in advance, and the bundle of these tubes 26 is arranged on the lower end side of each introduction path, and, for example, the tubes 26 located at the outer peripheral portion may be fixed to the partition wall 24 by welding, bonding, caulking, etc. Alternatively, the tubes 26 located at the outer peripheral portion may be supported or fixed by being locked to or engaged with a supporting/fixing portion such as a protrusion provided on the partition wall 24 or the like.

Figure 4A:
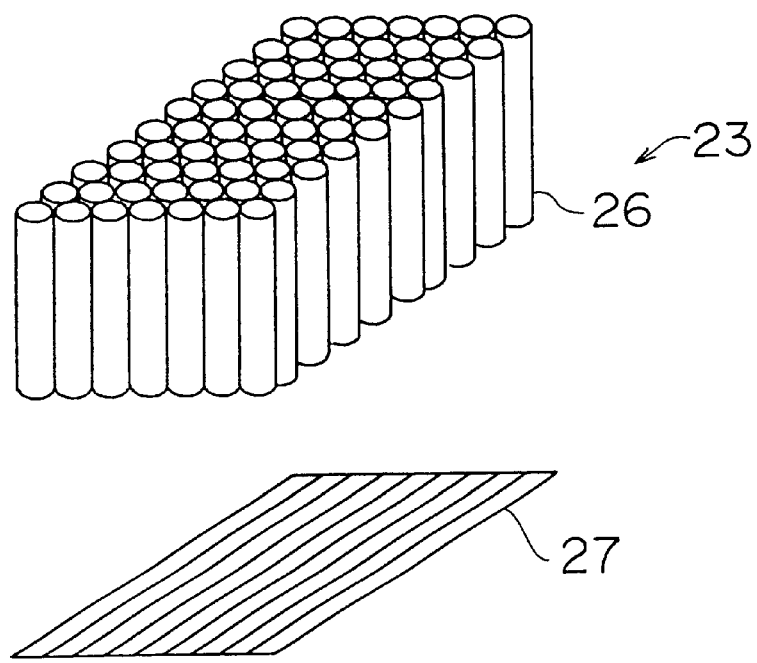
FIG. 4 is a view showing a typical construction of flow straightening means.

Also, as the assembling construction that is thought to have high assembly efficiency, the construction described below is possible. For example, a net-shaped member 27 as shown in FIG. 4(a) is installed to the lower end of each of the introduction paths 21a, 21b and 21c by welding, bonding, caulking, etc. so as to cover the lower end opening thereof. Then, a number of tubes 26 are dropped vertically in succession from the upper end opening of each of the introduction paths 21a, 21b and 21c, and are placed on the net-shaped member 27 in a state of being erected closely. Alternatively, some number of the tubes 26 are bundled and fixed to each other in advance, and the bundle of tubes is dropped and placed on the net-shaped member 27.

With such a construction, the whole of the tubes 26 need not be bundled and fixed to the liquid content introduction path 21, so that the installation work becomes easier as compared with other constructions as the apparatus becomes larger and the number of the packed tubes 26 increases.

The tube 26 may be made of any material unless the material is corroded by a component of the filtrate W1 (or if the material is subjected to surface treatment etc. for providing corrosion resistance). However, a tube with a thin wall thickness is preferable in order that the decrease in cross-sectional area of flow path caused by the packing of the tubes 26 is made small to a negligible degree. Also, it is preferable that the tube have a larger specific gravity than that of the filtrate W1 so as to be submerged under the liquid level. The reason for this is that for the aforementioned construction in which the tubes 26 are simply placed on the net-shaped member 27 (the construction in which the tubes 26 are not fixed to the lower end of the liquid content introduction path), the necessary condition is that the tubes 26 are not floated by the buoyancy thereof.

The length L8 and the inside diameter of the tube 26 are set so that the aspect ratio is sufficiently low to prevent the turbulence of liquid moved by the agitation in the filtrate tank 8 from reaching the upper end side of the tube 26. For example, for the flue gas desulfurization system provided in a thermal power plant with an output of 1 million Kw, the length L8 of the tube 8 may be set at about 1 m, for example, as described before, and the inside diameter thereof may be set at about 32 mm, for example.

The cross-sectional shape of the tube 26 is not limited to a circular shape, and may be a square shape.

The following is a description of the operation of the liquid extracting apparatus 20.

According to the above-described liquid extracting apparatus 20, by operating the pump 22, a flow of a predetermined flow rate is generated, and the liquid of this predetermined flow rate is discharged from the filtrate tank 8 through the liquid content introduction path 21, the connection pipe 22a, and the pump 22.

At this time, by the setting of the dimensions of the aforementioned flow straightening means 23 (tube 26), the turbulence of liquid in the filtrate tank 8 does not reach the upper end side of the flow straightening means 23, and the flow velocity of liquid in the flow straightening means 23 is lower than the precipitation speed of the suspended solids at least in the region in which there is no turbulence. As a result, the suspended solids in the liquid are separated from the liquid content in the flow straightening means 23 without rising to the upper end thereof. For this reason, the liquid (waste water W2) discharged from the pump 22 through the connection pipe 22a scarcely contains the suspended solids, or is a liquid with a decreased suspended solid concentration, so that only the liquid content with a far lower suspended solid concentration than that of the filtrate W1 is extracted at a predetermined flow rate.

Thereupon, according to the apparatus of this embodiment, even if a high-performance machine is not used as the solid-liquid separator 7, the required conditions of the maximum flow rate (for example, 20 m$^3$/h) of waste water and the suspended solid concentration (for example, 500 mg/l and lower) can easily be satisfied.

Specifically, since the apparatus of this embodiment has the flow straightening means 23 for dividing the lower end portion of the liquid content introduction path 21 into a number of long paths along the flow direction, even if the inside diameter (aspect ratio) of the whole of the liquid content introduction path 21 increases, the influence of movement of the liquid in the filtrate tank 8 caused by the agitator 9 is lessened, and the precipitation and separation of suspended solids are attained effectively in the liquid content introduction path 21 (especially in the flow straightening means 23), so that a large amount of liquid content with a lower suspended solid concentration than that of the liquid in the filtrate tank 8 can be discharged.

Particularly in the case of the apparatus of this embodiment, since the interior of the liquid content introduction path 21 is divided into the three introduction paths 21a, 21b and 21c in the lengthwise direction by the walls 25a and 25b, and the pump 22 is connected to each of these sections, even if the liquid content introduction path 21 has a large depth L1, convection caused by the deflected temperature distribution etc. is unlikely to occur, and the upward flow of a predetermined flow velocity is likely to occur more uniformly, so that the precipitation and separation of suspended solids are attained more effectively over the whole range, and a large amount of liquid content with a sufficiently low suspended solid concentration can be discharged.

Also, in the apparatus of this embodiment, since the flow straightening means 23 has a simple construction In which the tubes 26 are provided on the lower end side of the liquid content introduction path 21 in a packed state, the apparatus is more advantageous in terms of cost as the apparatus is made larger.

Further, in the apparatus of this embodiment, since the liquid content introduction path 21 is formed by partitioning the interior of the filtrate tank 8 by the partition wall 24 provided so as to pass by the liquid level, and the upper end of the liquid content introduction path 21 is open, the manufacture and installation of the liquid content introduction path 21 are easy. This respect also contributes to the reduction in cost, and the important operation and effects in practical use such that air bubbles are less liable to be mixed in the liquid to be discharged can be achieved. This is because even if air bubbles flowing in through the flow straightening means 23 are present, most of these air bubbles go away to the outside from the liquid level at the upper end of the liquid content introduction path 21, and does not flow into the connection pipe 22a of the pump 22.

For the cylinder of the conventional liquid extracting apparatus disclosed in the Publication, described before, the closed upper end thereof is connected to the suction opening of the pump. Therefore, when the air bubbles flow into the cylinder, all of these air bubbles are sucked to the pump side, so that there is a possibility of reduced pump efficiency or pump damage induced by cavitation. In the aforementioned filtrate tank and the absorber tank, in order to prevent the solid content from accumulating, the liquid and slurry in the tank are always moved by the agitator, and accordingly the air bubbles float and move. Particularly in the absorber tank, since oxidizing air is blown into the tank as many air bubbles, a number of air bubbles move in the whole of the tank.

Next, a liquid extracting apparatus 30 provided in the absorber tank 2 will be described with reference to FIG. 5.

The liquid extracting apparatus 30, which is an apparatus for discharging slurry liquid content with a low suspended solid concentration from the tank 2 of the absorber 1, is provided in a case where a balance of inflow/outflow water (water balance) cannot be attained with respect to the circulation system of the tank 2, so that there is a possibility of decreasing the suspended solid concentration of the slurry S in the tank 2 beyond the allowable range. In this case, the water which flows into the circulation system of the tank 2 to cause the water balance to be upset is mainly the cleaning water W4 for the air sparger 3. Therefore, for the maximum flow rate Q1 of the liquid to be extracted that should be attained by the liquid extracting apparatus 30, approximately the flow rate of the cleaning water W4 (for example, 4 m$^3$/h) is enough.

The liquid extracting apparatus 30 comprises liquid extracting means 31 by which the slurry in the tank 2 can be caused to flow out by means of a head difference h, a liquid content introduction path 32 for separating suspended solids from the slurry introduced to the liquid extracting means 31, flow straightening means 33 for dividing the lower end portion of the liquid content introduction path 32 into a number of long flow paths along the flow direction, and an agitator 34 for agitating a region under the liquid content introduction path 32 in the tank 2.

The liquid extracting means 31 is made up of a conduit 35 (outflow port) which is connected to an opening formed at a position under the slurry liquid level on the side wall of the tank 2 and extends to the side of the tank 2, and a valve 36 (opening/closing member) connected to the end of the conduit 35.

In this case, the whole of the flow path composed of the conduit 35, the valve 36, and a pipe connected to the valve 36 is inclined upward at an angle $\theta$ with respect to the horizontal toward the outside (slurry outflow direction).

The angle $\theta$ is set to an angle of repose (about 5 degrees) or larger of gypsum particles in the liquid. Thus, the flow path has no horizontal portion, and the whole of the flow path is inclined at least at the angle of repose, which offers an advantage that the production of scale in the conduit 35, the valve 36, etc. caused by the precipitation of gypsum particles and the clogging thereof caused by scale can be prevented.

The head difference h, which, in this case, is a difference between the discharge opening position of the pipe connected to the outlet side of the valve 36 and the height of the slurry liquid level, has a value that achieves the necessary extraction flow rate Q1, and may be set at a value determined by Bernoulli's theorem or the calculation of flow path resistance. For example, according to the calculation made by the inventors, if h is set at about 1 m, the extraction flow rate Q1 of about 4 m$^3$/h corresponding to the aforementioned flow rate of the cleaning water W4 can be achieved.

Also, the liquid content introduction path 32 in this case has, for example, a square shape in cross section, and is formed by partially partitioning the interior of the tank 2 by using a partition wall 37 having a U shape in cross section, whose upper edge extends above the liquid level and whose lower edge extends below the liquid level. Therefore, in this case as well, the upper end of the liquid content introduction path 32 is open, so that even if air bubbles flowing into the liquid content introduction path 32 are present, they can be extracted from the upper end side thereof, and also the manufacture and installation of the liquid content introduction path 32 are easy and less-costly.

The inside dimension L11 of the liquid content introduction path 22 is set, as in the case of the aforementioned liquid extracting apparatus 20, so that when the slurry flows out from the valve 36 through the liquid content introduction path 32 and the liquid extracting means 31 by means of the head difference h, the flow velocity of liquid content in the region in which there is no turbulence is lower than the precipitation speed of solid content.

Specifically, for example, if Q2 is the aforementioned 4 m$^3$/h, Q2/V=4/10=0.4 m$^3$. In this case, therefore, the inside dimension L11 may be set at a value (0.63 m) such that the inside area is 0.4 m$^3$.

If the inside dimension L11 is set larger, and thereby the flow velocity V of the slurry rising in the liquid content introduction path 32 is set lower, the liquid content with a lower suspended solid concentration can be extracted. Therefore, the inside dimension L11 may be set appropriately according to the required suspended solid concentration and flow rate of the liquid to be extracted. For example, if the flow velocity is set at a value not higher than 4 m/h, as seen from the demonstration data, described later, the suspended solid concentration of the liquid to be extracted can be made not higher than about 10 g/l.

The length of the liquid content introduction path 32 should be set so that a distance L12 (shown in FIG. 5) between the upper face of the flow straightening means 33 and the opening connected with the conduit 35 is sufficiently secured to prevent the deflected flow velocity at least in the flow straightening means 33 caused by the influence of the inflow of liquid into the conduit 35.

The flow straightening means 33, like the aforementioned flow straightening means 23 of the liquid extracting apparatus 20, divides the lower end portion of the liquid content introduction path 32 into a number of long flow paths along the flow direction. For example, the flow straightening means 33 is made up of a net-shaped member 38 installed so as to cover the lower end opening of the liquid content introduction path 32, and a number of tubes 39 which are placed closely on the upper face side of the net-shaped member 38 and are provided on the lower end side of the liquid content introduction path 32 in a packed state. The length L13 and the inside diameter of the tube 39 are set at values such that the aspect ratio is sufficiently low so that the turbulence of liquid heavily moved by the agitation in the absorber tank 2 does not reach at least the upper end side of the tube 39.

The agitator 34 is made up of an axial-flow agitator blade provided in a region under the liquid content introduction path 32 in the tank 2 or provided so as to face that region, a motor which is provided on the outside of the tank 2 to drive the agitator blade, and shaft sealing means for a rotating shaft connecting these elements. By agitating the region under the liquid content introduction path 32, the separated solid content is prevented from staying or depositing in this region.

The following is a description of the operation of the above-described liquid extracting apparatus 30 and the method for controlling the slurry concentration in the tank 2 using the apparatus 30.

According to the liquid extracting apparatus 30, opening of the valve 36 produces a flow of a predetermined flow rate determined by the flow path resistance of the liquid extracting apparatus 30 including the resistance of the valve 36 and the head difference h, and discharges the liquid of this predetermined flow rate through the liquid content introduction path 32 and the liquid extracting means 31.

At this time, by the aforementioned dimension setting of the flow straightening means 33 (tube 39), the turbulence of the slurry S in the tank 2 does not reach at least the upside beyond the upper part of the flow straightening means 33, and at least in the region in which there is no turbulence, the flow velocity of liquid in the liquid content introduction path 32 is lower than the precipitation speed of the suspended solids. As a result, the suspended solids in the slurry are separated from the liquid content mainly in the flow straightening means 33 without rising to the upper part of the liquid content introduction path 32. Therefore, the liquid discharged from the valve 36 scarcely contains suspended solids or is a liquid with a reduced suspended solid concentration, so that only the liquid content in the slurry is extracted at the predetermined flow rate.

Thereupon, according to the above-described apparatus, positive control of concentration of the slurry S as described below can be carried out. As described above, at the time of low load or at the time of shutdown, when the concentration of the slurry S in the tank 2 reduces beyond the optimum range, or when there is a possibility of reducing, by automatic control of a controller 15 (shown in FIG. 1) that detects the reduction in concentration by means of a concentration sensor 14 (shown in FIG. 1), or by manual operation of an operator who judges this state, the flow rate of the slurry extracted through the pipeline 6 may be decreased, or the extraction may be stopped. Also, the valve 36 of the liquid extracting apparatus 30 may be opened to a degree of opening in response to the degree of reduction in concentration.

Since the maximum discharge capacity of the liquid extracting apparatus 30 can be set equal to the flow rate of the charged clean water W4, which increases the liquid content in the slurry S, as described above, by opening the valve 36, the concentration of the slurry S can surely be kept within the aforementioned optimum range even at the time of low load or at the time of shutdown.

On the other hand, when the concentration of the slurry S inversely exceeds the optimum range, or when there is a possibility of exceeding, by automatic control of a controller 15 that detects the increase in concentration by means of the sensor, or by manual operation of an operator who judges this state, the valve 36 of the liquid extracting apparatus 30 may be throttled, or closed completely. Also, the supply amount of water into the tank 2 may be increased in response to the degree of the increase in concentration, and further the operation for increasing the flow rate of the slurry S extracted through the pipeline 6 may be added. As the operation for increasing the supply amount of water into the tank 2, the supply amount of the returned liquid W3 directly supplied into the tank 2 or the make-up water may be increased, or the amount of water contained in the absorbent slurry and supplied may be increased.

The surplus liquid discharged from the liquid extracting apparatus 30 may be discharged after being subjected to waste water treatment necessary to meet the discharge standard. If the water balance can be attained, the surplus liquid may be reused as part of the liquid content constituting the absorbent slurry by being charged in the aforementioned slurry preparation tank (not shown), for example. By doing this, the waste water treatment becomes unnecessary, and the amount of water charged in the slurry preparation tank can be saved.

Also, the aforementioned surplus water may be used as general industrial water. Alternatively, it can be used as cleaning water for cleaning the parts of the desulfurization system, such as the cleaning water for the air sparger in the absorber, or the cleaning water for a mist eliminator (not shown) provided at the flue gas outlet of the absorber.

The solid content separated in the liquid content introduction path 32 settles in the liquid content introduction path 32. In this case, the solid content does not especially stay or deposit under the liquid content introduction path 32 because of the agitating operation of the agitator 34. In this embodiment, therefore, the change in concentration of extracted liquid caused by such staying or depositing and the production of scale at the bottom of the tank can surely be prevented.

EXAMPLES

Example 1

Figure 6:
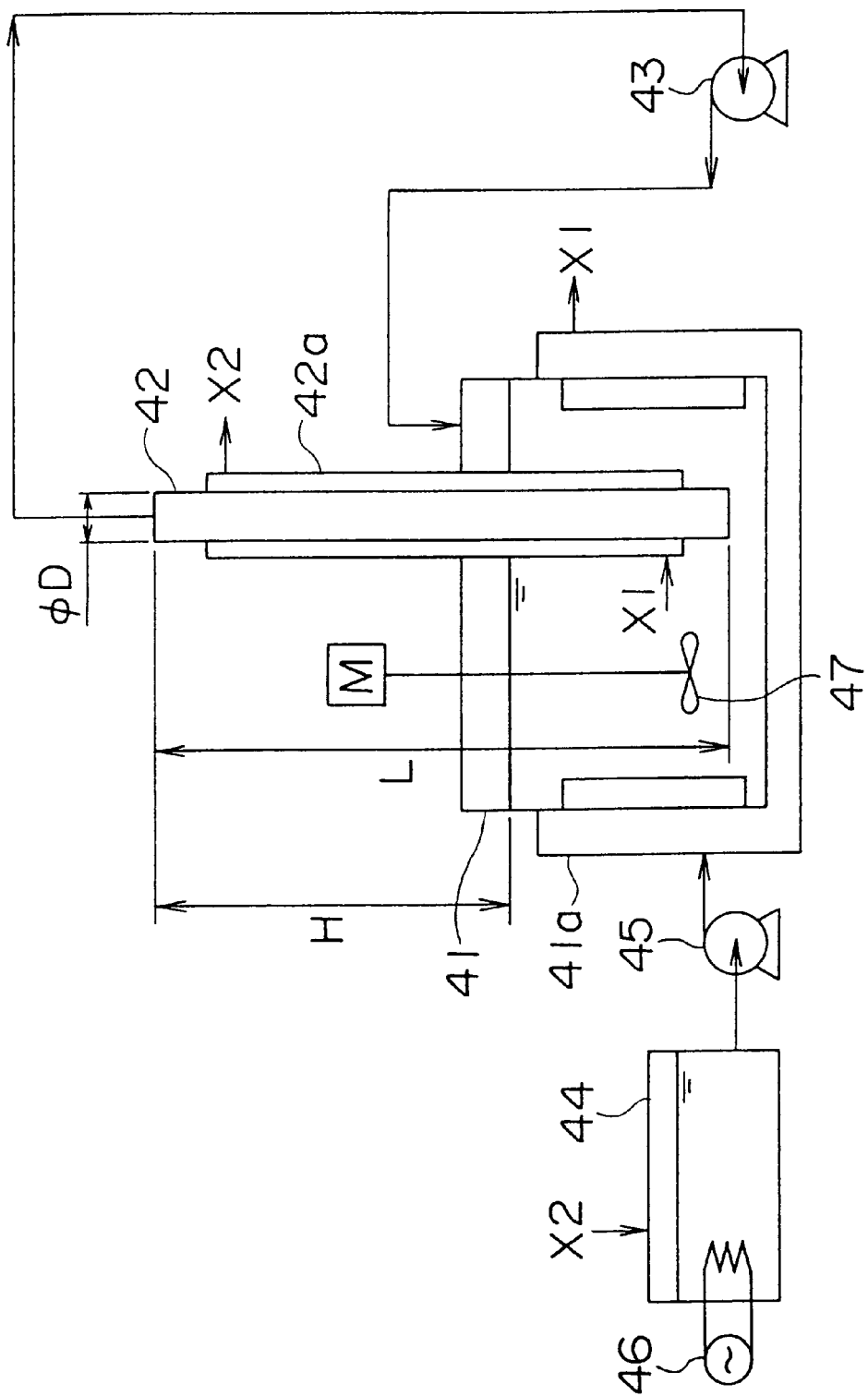
FIG. 6 is a schematic view of an experimental apparatus for demonstrating the operation of the present invention.

Next, experimental data 1 that proves the operation and effects of the liquid extracting apparatus in accordance with the present invention will be described as an example 1. The experimental apparatus was configured as shown in FIG. 6.

Specifically, a slurry tank 41, which was assumed to be the absorber tank or the filtrate tank of the desulfurization system, is filled with a stock solution of slurry, and a liquid extracting tube 42 serving as the liquid content introduction path (exactly, the flow path in the flow straightening means) was erected so as to project upward from the slurry tank 41. The slurry liquid content in the slurry tank 41 was extracted by a suction pump 43 via the liquid extracting tube 42, and was returned into the slurry tank 41 again for recirculation.

As the slurry stock solution, the actual absorber slurry taken from the absorber tank of the desulfurization system (actual system) was used. The slurry stock solution had a suspended solid concentration of 240.7 g/l, a gypsum concentration of 1309.0 mmol/l, and an unreacted limestone concentration of 126.0 mmol/l.

The slurry tank 41 and the liquid extracting tube 42 were provided with water jackets 41a and 42a, respectively, and warm water in a constant-temperature tank 44 was caused to flow and circulated successively in the water jackets 41a and 42a by a warm water supply pump 45. By controlling the output of a heater 46 for heating the warm water in the constant-temperature tank 44, the temperatures of the slurry in the slurry tank 41 and the slurry circulating through the liquid extracting tube 42 were kept at the ordinary operation temperature (50° C.) of the absorber slurry in the desulfurization system (actual system).

Also, the slurry in the slurry tank 41 was agitated by an agitator 47 as in the case of the absorber of the desulfurization system (actual system).

The inside diameter D of the liquid extracting tube 42 was set at 35 mm, the length L thereof was set at 1000 mm, and the height H above the liquid level of the liquid extracting tube 42 was set at 800 mm.

In the experiment, the suspended solid concentration etc. of overflow slurry (extracted liquid) extracted from the liquid extracting tube 42 were measured with the slurry rising velocity V (m/h) in the liquid extracting tube 42 being changed to 1, 2, 4, 7 and 10 by regulating the flow rate of the suction pump 43.

Figure 7:
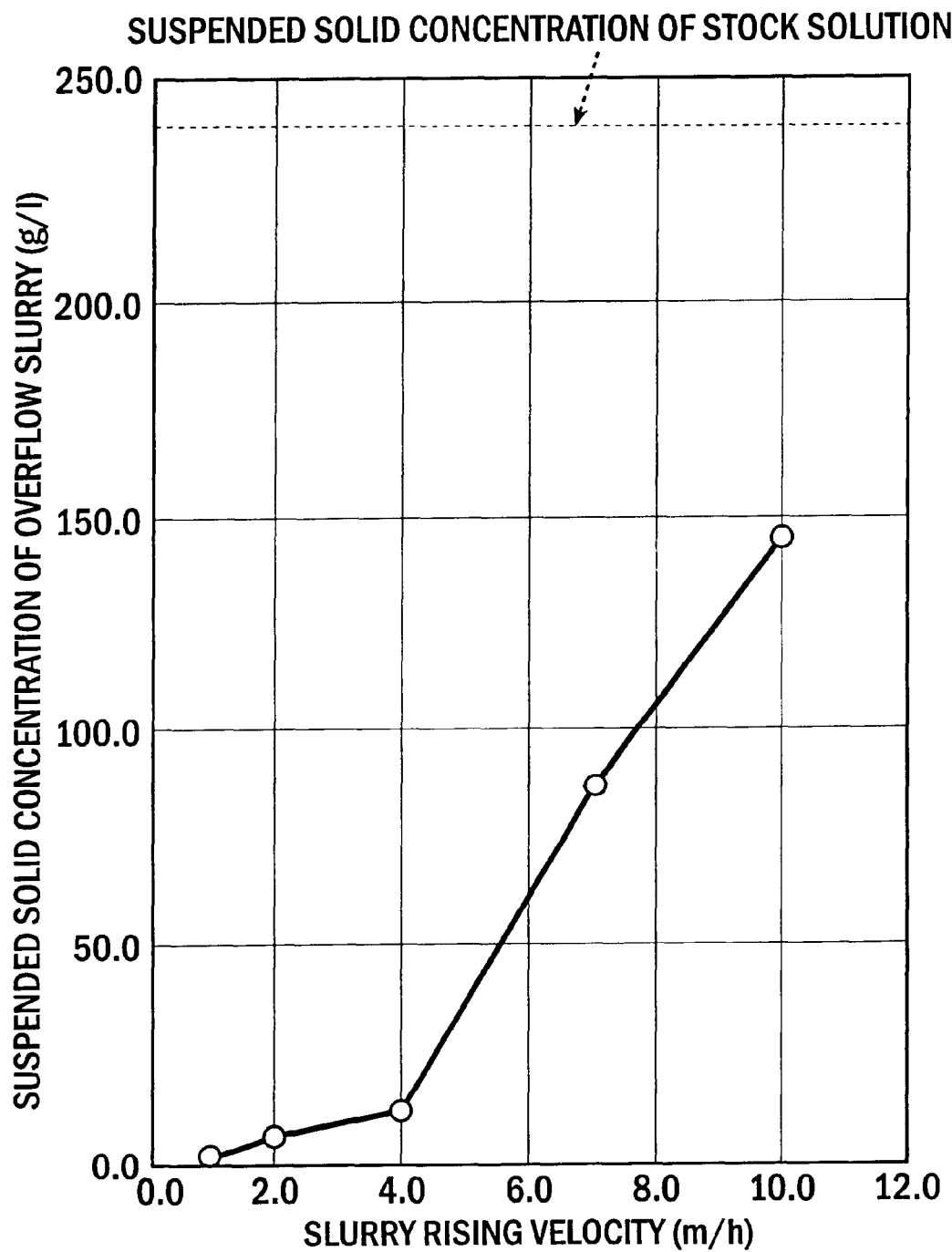
FIG. 7 is a graph showing a result of experiment for demonstrating the operation of the present invention.

The result of experiment is shown in FIG. 7. The suspended solid concentrations (g/l) for each velocity V were 1.4, 5.4, 10.4, 83.5 and 144.0. It was proved that if the velocity V was set at a value not higher than 10 m/h, the liquid content with a suspended solid concentration remarkably lower than the suspended solid concentration of the stock solution could be extracted. In particular, it was found that if the velocity V was set at a value not higher than 4 m/h, the suspended solid concentration of the extracted liquid could be reduced significantly.

Incidentally, the gypsum concentrations of the extracted liquid for each velocity V were 7.2, 10.0, 8.7, 454.7 and 784.9 mmol/l. Also, the unreacted limestone concentration of the extracted liquid for each velocity V were 0.8, 31.4, 78.3, 49.3 and 85.1 mmol/l.

Example 2

Next, experimental data 2 that proves the operation and effects of the liquid extracting apparatus in accordance with the present invention will be described as an example 2.

The experimental apparatus had the same configuration as that for the experimental data 1 shown in FIG. 6. As the slurry stock solution, actual filtrate taken from the filtrate tank of the desulfurization system (actual system) was used.

This stock solution had a suspended solid concentration of 3400 mg/l, a gypsum concentration of 18.5 mmol/l, and an unreacted limestone concentration of 1.8 mmol/l.

The temperatures of the filtrate in the slurry tank 41 and the filtrate circulating through the liquid extracting tube 42 were kept at the ordinary temperature (50° C.) of the filtrate tank of the desulfurization system (actual system).

Also, the filtrate in the slurry tank 41 was agitated by the agitator 47 as in the case of the filtrate tank of the desulfurization system (actual system).

In the experiment, the suspended solid concentration etc. of overflow slurry (extracted liquid) extracted from the liquid extracting tube 42 were measured with the slurry rising velocity V (m/h) in the liquid extracting tube 42 being changed to 1, 2, 3, 6 and 10 by regulating the flow rate of the suction pump 43.

Figure 8:
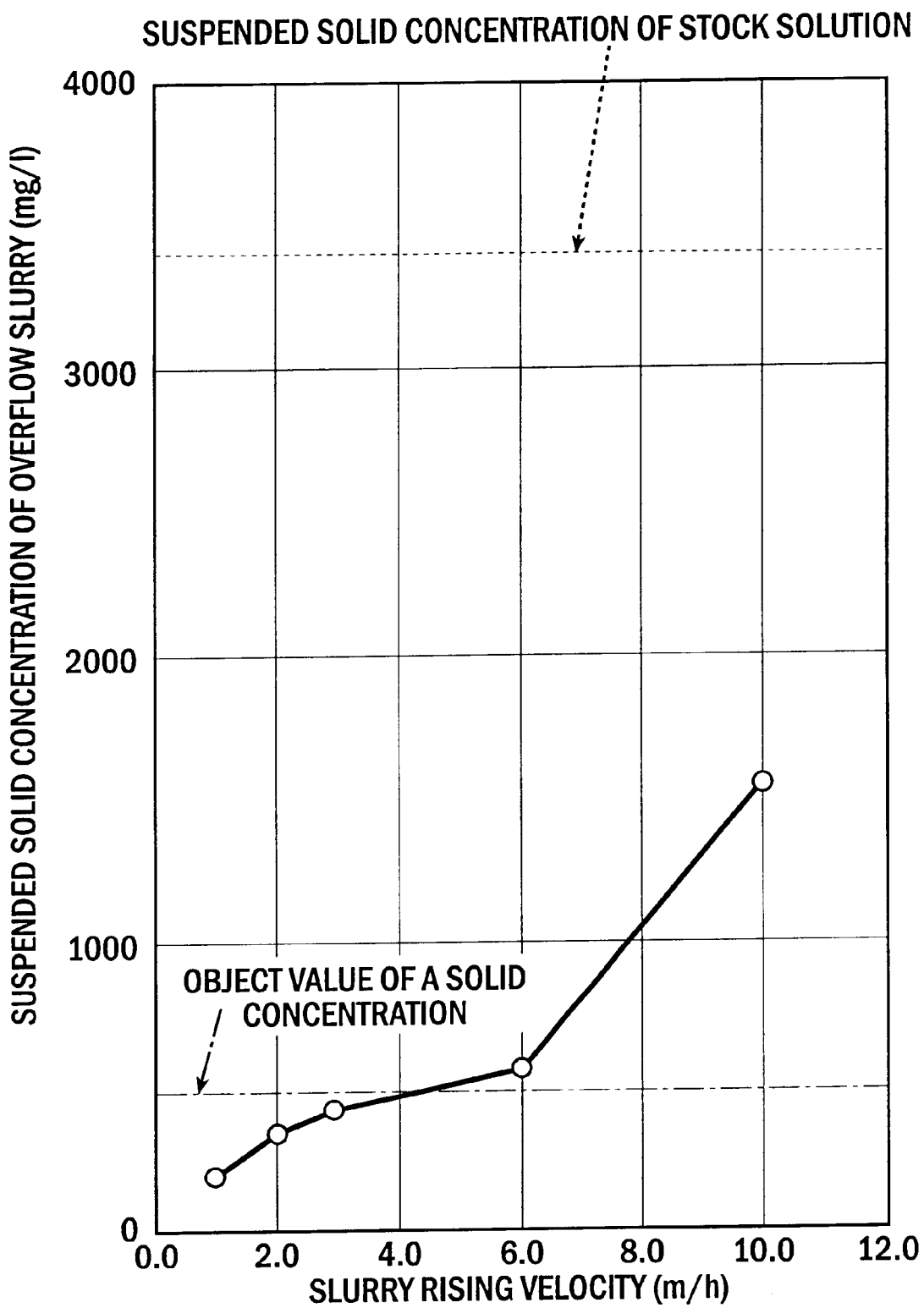
FIG. 8 is a graph showing a result of experiment for demonstrating the operation of the present invention.

The result of experiment is shown in FIG. 8. The suspended solid concentrations (mg/l) for each velocity V were 200, 340, 430, 540 and 1500. It was proved that if the velocity V was set at a value not higher than 10 m/h, the liquid content with a suspended solid concentration remarkably lower than the suspended solid concentration of the stock solution could be extracted. In particular, it was found that if the velocity V was set at a value not higher than 5 m/h, the condition of the suspended solid concentration of the extracted liquid (not higher than 500 mg/l) could be satisfied satisfactorily.

Incidentally, the gypsum concentrations of the extracted liquid for each velocity V were 0.1, 0.1, 0.2, 0.2 and 6.4 mmol/l. Also, the unreacted limestone concentration of the extracted liquid for each velocity V were <0.1, <0.1, <0.1, <0.1 and <0.1 mmol/l.

The present invention is not limited to the above-described embodiment, and various modifications can be made.

For example, the application of the liquid extracting apparatus in accordance with the present invention is not limited to the above-described absorber tank and filtrate tank of the desulfurization system, and the apparatus can be applied to any tank of a system and plant that must discharge liquid content from slurry with a simple construction and can achieve the same effects.

Figure 4B:
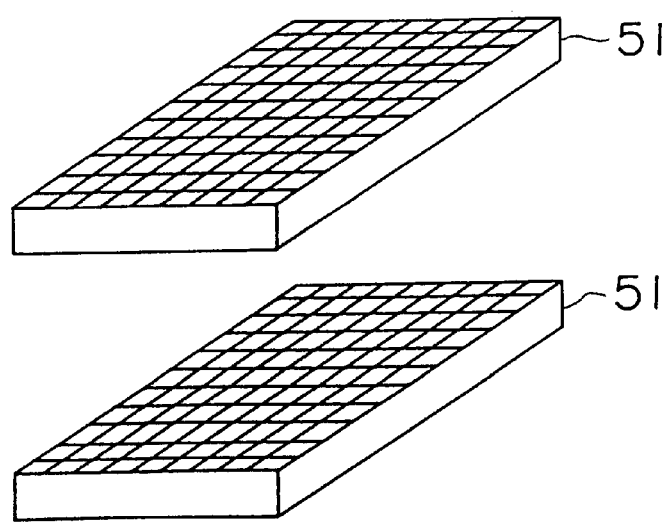

Also, the construction of the flow straightening means in accordance with the present invention is not limited the above-described one which is made up of a number of tubes. For example, as shown in FIG. 4(b), the construction may be such that a plurality of plate-shaped members 51 in which a number of chambers or holes that are open on the upper and lower face sides are formed over the whole face thereof are stacked as necessary and are disposed so as to occupy the whole of the lower end portion of the liquid content introduction path. In this case, the chambers or holes are stacked as necessary and communicate with each other, and thereby a number of long flow paths are formed along the flow direction, so that the same operation and effects as those of the above-described embodiment can be achieved. A structure such as the plate-shaped member described above can be manufactured easily, for example, by integral molding of a synthetic resin.

Also, the liquid content introduction path and a number of flow paths of the flow straightening means of the present invention need not necessarily be disposed vertically, and may be somewhat inclined. Also, to make the apparatus light in weight, the tube constituting the flow straightening means and the wall for partitioning the interior of the liquid content introduction path may be provided with, for example, a number of small holes to a degree such that the straightening operation is not hindered.

Also, the construction may be such that a partition wall for isolating the agitator in the tank from the liquid content introduction path is erected on the bottom surface of the tank so as to further cover the outside of the wall constituting the liquid content introduction path to surely prevent the agitated flow or air bubbles from entering the liquid content introduction path. In such a partition wall, an opening for causing the slurry to pass through is formed, or the partition wall is provided so that the upper edge thereof is located at a position lower than the liquid level, by which the slurry can be caused to flow without trouble. In this case, at the time of liquid extraction, the slurry in the tank flows to the inside of the partition wall after passing through the opening or the upside of the partition wall, and flows into the liquid content introduction path through the lower end opening thereof.

Also, in FIG. 1, an agitator that is the same as the agitator 34 of the liquid extracting apparatus 30 may be provided under the liquid content introduction path 21 of the liquid extracting apparatus 20 provided in the filtrate tank 8.

Figure 5:
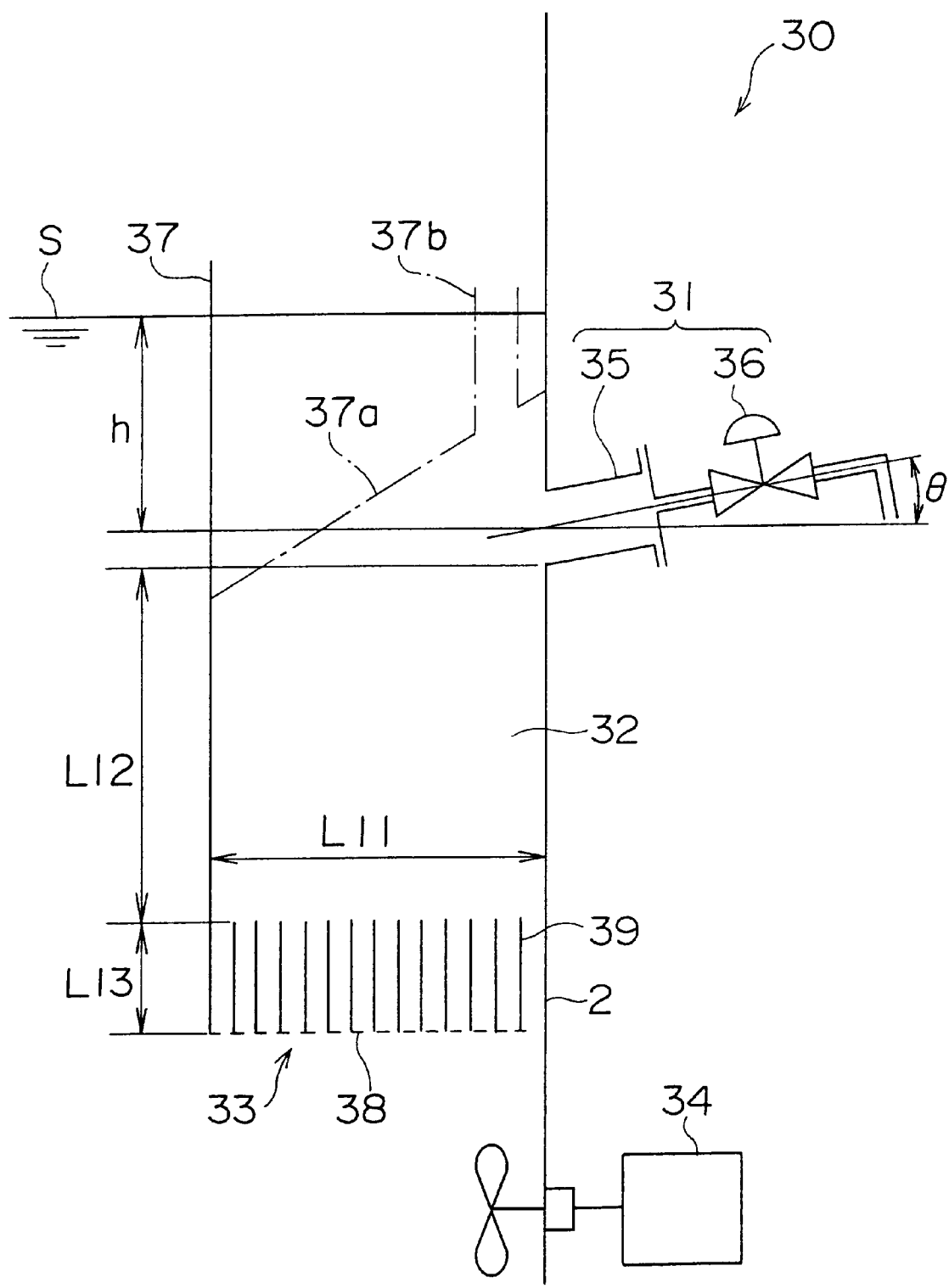
FIG. 5 is a schematic view of a liquid extracting apparatus for a filtrate tank of the system.

Also, the liquid extracting means in accordance with the present invention need not necessarily be provided with an opening/closing means such as the valve 36 of the liquid extracting apparatus 30 shown in FIG. 5, and the apparatus can naturally be used so that a certain amount of liquid content is always discharged to the outside of tank continuously. Specifically, for example, in FIG. 5, a construction is possible in which the valve 36 is eliminated, and liquid content is always discharged through the conduit 35 (outflow port) by the head difference h. On the other hand, for example, a flow rate regulating valve is provided on the discharge side of the pump 22 of the liquid extracting apparatus 20 shown in FIGS. 1 and 2, by which the flow rate of the extracted liquid may be changed appropriately by manual operation or automatic control of this valve.

Also, in the case where the filtrate tank is provided on the ground, the liquid extracting means of the liquid extracting apparatus provided in the filtrate tank may be configured so as to discharge the liquid content by means of the head difference (configured in the same way as the above-described liquid extracting apparatus 30) to save the pump power. Needless to say, inversely, the liquid extracting means of the liquid extracting apparatus provided in the absorber tank may be configured so as to compulsorily discharge the liquid content by a pump (configured in the same way as, for example, the above-described liquid extracting apparatus 20).

Also, the configuration of the connection of the connection pipe of pump to the liquid content introduction path is not necessarily limited to a mode in which the connection pipe is inserted from the upside of the liquid content introduction path as shown in FIG. 2. For example, the connection pipe of pump may be connected to the outflow port provided on the side of the tank as shown in FIG. 5.

Also, the whole of the upper end of the liquid content introduction path need not necessarily be open. For example, as indicated by alternate long and short dash lines in FIG. 5, the liquid content introduction path may be formed as a space enclosed by a wall body 37a whose upper end is closed. In this case, however, it is preferable to provide, for example, a gas vent pipe 37b for extracting air bubbles flowing into the liquid content introduction path as shown in FIG. 5.

The present invention has been described above with reference to the embodiment and examples. These embodiment and examples have been provided for ease of understanding of the present invention, and do not limit the scope of the present invention. All changes, modifications, and additions of the invention defined in the claims, which are apparent to those skilled in the art, are embraced by the technical scope of the present invention.

INDUSTRIAL APPLICABILITY

The liquid extracting apparatus in accordance with the present invention can be applied suitably to, for example, a filtrate tank and an absorber tank of a wet type flue gas desulfurization system. According to the liquid extracting apparatus in accordance with the present invention, only the liquid content is discharged effectively from the tank by using a simple and less-costly construction in which liquid extracting means is connected to a liquid content introduction path provided with flow straightening means.

What is claimed is:

1. A liquid extracting apparatus for discharging slurry liquid content with a lower suspended solid concentration than that of slurry in which solid content is suspended in liquid from a tank in which said slurry is stored, comprising:
   a liquid content extraction path configured so that the lower end thereof is open toward the bottom surface of said tank so that said slurry can be introduced from the lower end side to achieve the precipitation and separation of solid content; liquid extracting means connected to the upper end side of said liquid content extraction path to extract slurry liquid content from said tank via said liquid content extraction path; and flow straightening means provided at the lower end portion of said liquid content extraction path;
   wherein said flow. straightening means is configured so that the lower end portion of said liquid content extraction path is divided into a number of long flow paths along the flow direction;
   wherein said flow straightening means is configured so that a number of tubes are provided at the lower end portion of said liquid content extraction path in a packed state; and
   wherein the flow straightening means is a bundle of tubes, wherein the shape of each of the tubes is a tapered shape, a bellows shape, or a spirally bent shape.

2. The liquid extraction apparatus according to claim 1, wherein said flow straightening means is configured so that a number of tubes are placed closely on a net-shaped member installed so as to cover the lower end opening of said liquid content extraction path.

3. The liquid extracting apparatus according to claim 2, wherein said liquid content extraction path is formed by partitioning a part of said tank by a partition wall whose upper edge projects above the liquid level in said tank and whose lower edge extends below the liquid level in said tank, and the upper end side of said liquid content extraction path is also open.

4. The liquid extracting apparatus according to claim 2, wherein said liquid extracting means is formed by an outflow port of slurry formed at a position lower than the slurry liquid level on the side wall of said tank, so that slurry in said tank is caused to flow out by a head difference.

5. The liquid extracting apparatus according to claim 2, wherein said liquid content extraction path has a radius and said liquid extracting means is connected to a plurality of locations in the radial direction of said liquid content extraction path.

6. The liquid extracting apparatus according to claim 5, wherein the interior of said liquid content extraction path is divided by walls for each location to which said liquid extracting means is connected.

7. The liquid extracting apparatus according to claim 1, wherein said flow straightening means is configured so that a plurality of plate-shaped members in which a number of chambers or holes that are open on a the upper and lower face sides are formed over the whole face thereof are stacked in communication with one another, and are disposed so as to occupy the whole of lower end portion of said liquid content extraction path; and a number of long flow paths are formed along the flow direction by said chambers or holes.

8. The liquid extracting apparatus according to claim 7, wherein said liquid content extraction path is formed by partitioning a part of said tank by a partition wall whose upper edge projects above the liquid level in said tank and whose lower edge extends below the liquid level in said tank, and the upper end side of said liquid content extraction path is also open.

9. The liquid extracting apparatus according to claim 7, wherein said liquid extracting means is formed by an outflow port of slurry formed at a position lower than the slurry liquid level on the side wall of said tank, so that slurry in said tank is caused to flow out by a head difference.

10. The liquid extracting apparatus according to claim 7, wherein said liquid content extraction path has a radius and said liquid extracting means is connected to a plurality of locations in the radial direction of said liquid content extraction path.

11. The liquid extracting apparatus according to claim 10, wherein the interior of said liquid content extraction path is divided by walls for each location to which said liquid extracting means is connected.

12. The liquid extracting apparatus according to claim 1, wherein said liquid content extraction path is formed by partitioning a part of said tank by a partition wall whose upper edge projects above the liquid level in said tank and whose lower edge extends below the liquid level in said tank, and the upper end side of said liquid content extraction path is also open.

13. The liquid extracting apparatus according to claim 12, wherein said liquid extracting means is formed by an outflow port of slurry formed at a position lower than the slurry liquid level on the side wall of said tank, so that slurry in said tank is caused to flow out by a head difference.

14. The liquid extracting apparatus according to claim 12, wherein said liquid content extraction path has a radius and said liquid extracting means is connected to a plurality of locations in the radial direction of said liquid content extraction path.

15. The liquid extracting apparatus according to claim 14, wherein the interior of said liquid content extraction path is divided by walls for each location to which said liquid extracting means is connected.

16. The liquid extracting apparatus according to claim 1, wherein said liquid extracting means is formed by an outflow port of slurry formed at a position lower than the slurry liquid level on the side wall of said tank, so that slurry in said tank is caused to flow out by a head difference.

17. The liquid extracting apparatus according to claim 16, wherein said liquid content extraction path has a radius and said liquid extracting means is connected to a plurality of locations in the radial direction of said liquid content extraction path.

18. The liquid extracting apparatus according to claim 17, wherein the interior of said liquid content extraction path is divided by walls for each location to which said liquid extracting means is connected.

19. The liquid extracting apparatus according to claim 1, wherein said liquid content extraction path has a radius and said liquid extracting means is connected to a plurality of locations in the radial direction of said liquid content extraction path.

20. The liquid extracting apparatus according to claim 19, wherein the interior of said liquid content extraction path is divided by walls for each location to which said liquid extracting means in connected.

* * * * *